(12) United States Patent
Bar-on et al.

(10) Patent No.: US 11,120,798 B2
(45) Date of Patent: Sep. 14, 2021

(54) VOICE INTERFACE SYSTEM FOR FACILITATING ANONYMIZED TEAM FEEDBACK FOR A TEAM HEALTH MONITOR

(71) Applicants: Atlassian Pty Ltd., Sydney (AU); Atlassian Inc., San Francisco, CA (US)

(72) Inventors: Noam Bar-on, San Francisco, CA (US); Bharath Booshan Lakshmi Narayanan, San Francisco, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 219 days.

(21) Appl. No.: 16/534,932

(22) Filed: Aug. 7, 2019

(65) Prior Publication Data
US 2020/0410998 A1 Dec. 31, 2020

Related U.S. Application Data

(60) Provisional application No. 62/867,346, filed on Jun. 27, 2019.

(51) Int. Cl.
| | |
|---|---|
| *G10L 15/22* | (2006.01) |
| *G06F 3/16* | (2006.01) |
| *G06Q 10/06* | (2012.01) |
| *G06F 3/0484* | (2013.01) |
| *G10L 13/00* | (2006.01) |

(52) U.S. Cl.
CPC ............ *G10L 15/22* (2013.01); *G06F 3/0484* (2013.01); *G06F 3/167* (2013.01); *G06Q 10/06393* (2013.01); *G10L 13/00* (2013.01); *G10L 2015/223* (2013.01)

(58) Field of Classification Search
CPC ... G10L 15/22; G10L 13/00; G10L 2015/223; G06F 3/048; G06F 3/167; G06Q 10/06393
See application file for complete search history.

(56) References Cited

U.S. PATENT DOCUMENTS

| | | | |
|---|---|---|---|
| 10,492,981 B1 * | 12/2019 | Kumar | G06F 3/167 |
| 10,692,112 B2 * | 6/2020 | von Cavallar | G06F 3/147 |
| 2016/0125345 A1 * | 5/2016 | Majumdar | G06F 16/248 |
| | | | 705/7.39 |
| 2019/0130071 A1 * | 5/2019 | Chatwani | G16H 40/20 |

* cited by examiner

*Primary Examiner* — Mohammad K Islam
(74) *Attorney, Agent, or Firm* — Brownstein Hyatt Farber Schreck, LLP

(57) ABSTRACT

A team health monitor system having a voice interface system for monitoring and improving team dynamics is described herein. The systems and techniques are directed to a voice interface system that is configured to conduct a health monitor or health diagnostic meeting in which a graduated score is received for a set of key team attributes from each of the meeting participants. The voice interface system also collects score narratives and pairs narratives with associated team attributes by determining a relevance percentage or similar criteria. The voice interface system is also configured to facilitate a consensus vote for each of the team attributes and construct an anonymized report that includes consensus scoring and composite narratives without attributing content to a particular team member or participant.

20 Claims, 7 Drawing Sheets

| INITIAL HEALTH MATRIX | INTERMEDIATE HEALTH MATRIX | FINAL HEALTH MATRIX |
|---|---|---|
| ATTRIBUTES | DEFINITION | EXAMPLE |
| BALANCED TEAM | YOU HAVE THE RIGHT PEOPLE, AND THEY KNOW WHAT IS EXPECTED... | THE LEADERSHIP TEAM HAS THE RIGHT PLAYERS ON-BOARD. |
| TEAM COHESIVENESS | MEMBERS PROACTIVELY PROVIDE THEIR EXPERIENCE AND INSIGHTS... | WE WORK WELL TOGETHER AND THERE'S A HEALTHY DEGREE... |
| SHARED UNDERSTANDING | THE TEAM HAS A SHARED VISION AND COLLECTIVE PURPOSE... | OUR VISION IS CLEAR AND WE'RE HAPPY THAT WE'VE MADE... |
| VALUE AND METRICS | THE GROUP IS CLEAR ON THEIR UNIQUE VALUE PROPOSITION... | WE HAVE CLEARLY DEFINED MEASURES OF SUCCESS... |
| DECISION MAKING | DECISIONS ARE MADE AT THE RIGHT LEVEL WITH AN APPROPRIATE... | DECISION MAKING CAN FEEL CLUNKY. SOMETIMES WE GO TOO... |
| ONE-PAGER | EACH MEMBER STANDS BEHIND THE GROUPS VISION AND VALUE, AND... | OUR ONE-PAGER IS THE STRATEGY PAGE ON OUR CONFLUENCE SPACE. |
| MANAGED DEPENDENCIES | CLEAR COMMUNICATION BETWEEN TEAM MEMBERS TO SHARE... | GENERALLY OK, WE'RE SURVIVING THROUGH "WATER COOLER"... |
| VELOCITY | THE TEAM REFLECTS ON, THEN... | WE'RE MAKING SOLID PROGRESS |

| ATTRIBUTES | SCORE | COMPOSITE SCORE NARRATION |
|---|---|---|
| FULL-TIME OWNER | ⊘ | Lorem ipsum dolor sit amet, consectetur adipiscing elit,upidatat non proident, sunt in culpa qui officia deserunt... |
| BALANCED TEAM | △ | Lorem ipsum dolor sit amet, consectetur adipiscing elit,upidatat non proident, sunt in culpa qui officia deserunt... |
| SHARED UNDERSTANDING | ⊘ | Lorem ipsum dolor sit amet, consectetur adipiscing elit,upidatat non proident, sunt in culpa qui officia deserunt... |
| VALUE AND METRICS | ▨ | Lorem ipsum dolor sit amet, consectetur adipiscing elit,upidatat non proident, sunt in culpa qui officia deserunt... |
| PROOF OF CONCEPT | △ | Lorem ipsum dolor sit amet, consectetur adipiscing elit,upidatat non proident, sunt in culpa qui officia deserunt... |
| ONE-PAGER | △ | Lorem ipsum dolor sit amet, consectetur adipiscing elit,upidatat non proident, sunt in culpa qui officia deserunt... |
| MANAGED DEPENDENCIES | ⊘ | Lorem ipsum dolor sit amet, consectetur adipiscing elit,upidatat non proident, sunt in culpa qui officia deserunt... |
| VELOCITY | ▨ | Lorem ipsum dolor sit amet, consectetur adipiscing elit,upidatat non proident, sunt in culpa qui officia deserunt... |

Tabs: INITIAL HEALTH MATRIX | INTERMEDIATE HEALTH MATRIX | FINAL HEALTH MATRIX

*FIG. 3C*

VOICE INTERFACE SYSTEM FOR FACILITATING ANONYMIZED TEAM FEEDBACK FOR A TEAM HEALTH MONITOR

CROSS-REFERENCE TO RELATED APPLICATION(S)

This application is a nonprovisional patent application of and claims the benefit of U.S. Provisional Patent Application No. 62/867,346, filed Jun. 27, 2019 and titled "Voice Interface System for Facilitating Anonymized Team Feedback for a Live Team Health Monitor," the disclosure of which is hereby incorporated herein by reference in its entirety.

TECHNICAL FIELD

Embodiments described herein relate to a team management system and, in particular, to systems and methods for facilitating a team health meeting using voice-activated prompts and anonymized team feedback.

BACKGROUND

Technical engineering teams, management teams, and other high-performing teams typically exhibit certain qualities that lead to a successful and productive team environment. Traditionally, when issues with team dynamics arise, they either go unnoticed or individuals must raise potential issues with a leader or manager, who is tasked with resolving the issue. These types of traditional troubleshooting techniques result in inconsistent results and, at times, the reporting structure exposes the team member or employee to some level of perceived risk which may cause some team members to remain silent. As a result, some issues remain unaddressed even though multiple team members may share the same problem or issue. The systems and techniques described herein are directed to an automated voice interface system that is configured to evaluate and monitor the health of a team and report the results using anonymized reports that include diagnostics and narratives from the team.

SUMMARY

Embodiments described herein are directed to an automated voice-activated system that facilitates live meetings that have a structured or semi-structured format or meeting flow. As described herein, a voice interface system includes a flow interactor that is adapted to conduct a particular meeting format and interface with a host service. The host service may include one or more remote servers that store and track team health data, issue tracking data, product development data, or other computer managed information. The voice interface system is able to detect and analyze voice input from the live meeting and, using a predictive model, infer one or more actions to be performed on the host service. A terminal device having a display produces a graphical user interface that is adapted to mirror the activity or actions performed by the voice interface system.

In some implementations, a voice interface system is configured to conduct a team health monitor meeting. The voice interface system, in this instance, may be adapted to provide a specific set of prompts in order to collect a first round of feedback from the group or team. During the first round of feedback, a prompt is provided that includes a description of a key attribute of the team or group. The voice interface system may interpret voice input and provide further explanation about the key attribute or about the health monitor process as the meeting is conducted. In response, the team may provide individual feedback that includes a graded scale that indicates how well the team meets a particular attribute. The feedback may also include a brief narrative that justifies the graded scale and/or includes other content associated with the attribute. The voice interface system may be adapted to pair received feedback with one of the key attributes and generate a log or composite narrative that includes the brief narrative without attributing the content with the specific meeting participant. Based on the feedback collected from the meeting participants, the voice interface system may facilitate the collection of a consensus vote from the team. The consensus vote and the composite feedback may be transmitted in a health report or matrix back to a host system in an anonymized fashion. For example, the health report may include narratives and scores that were collected during the live meeting without attributing any specific content with a particular user or participant.

Another example embodiment is directed to an issue tracking system that is configured to track issues, tickets, or tasks. The issue tracking system may be used to create, modify, and delete issue records during a live meeting or event. As described herein, the issue records may be updated during a live meeting using the voice interface system. The systems and techniques described herein use a voice interface system that is configured to interpret voice input from the participants in the meeting and identify a respective issue (from a set of displayed issues). The voice interface system may also receive and analyze further voice input that relates to activities conducted or to be conducted with respect to the identified issue. An issue record associated with the issue may be modified or edited in accordance with content extracted from the analyzed voice input, which may be stored by the issue tracking system and/or displayed during the meeting. The voice interface system may, in some cases, repeat this process for each issue to be discussed during the meeting based on voice commands received from the respective meeting participants.

Some example embodiments are directed to a voice-activated networked system for producing an anonymized health matrix for a team of participants during a live meeting. The system may include a terminal device having a display that is configured to display a graphical user interface. The system may also include a host service including a profile management server and an attribute library and a voice interface system for facilitating the live meeting attended by the team of participants. The voice interface system may include a processing unit that is configured to: receive a selection of a team type; in response to the selection of the team type, cause the graphical user interface to display an initial health matrix, the initial health matrix including a set of team attributes obtained from the attribute library of the host service based on the team type. For each team attribute of the set of team attributes, the processing unit may be configured to: produce a speech audio prompt including a description a respective team attribute of the set of team attributes; receive a participant score from each participant of the team of participants for the respective team attribute; receive a narration voice input from one or more participants of the team of participants regarding the participant score; analyze the narration voice input to determine a set of score narrations; receive a consensus voice input from the team of participants; and analyze the consensus voice input to determine a consensus score for the respective team attribute. The processing unit may also be configured to generate a completed health matrix including a visual indicia for each consensus score associated with each team attribute of the set of team attributes; and transmit the completed health matrix and the set of score narrations to the profile management server, wherein each score narration of the set of score narrations is not associated with a specific participant of the team of participants.

In some embodiments, during the live meeting, each participant of the group of participants operates a respective client device running a respective client application. Each participant may input the participant score using the respective client application running on the respective client device. The voice interface system may receive the participant score from each respective client device via a network.

In some cases, the participant score is defined by a graduated scale including three or more levels. The three or more levels may include: a first level indicating that the team of participants satisfies the respective team attribute; a second level indicating that the team of participants partially satisfies the respective team attribute; and a third level indicating that the team of participants does sufficiently satisfy the respective team attribute.

In some instances, the voice interface system is configured to cause the graphical user interface to display an intermediate health matrix. The intermediate health matrix may include a visual shape indicia representing each client score received from the team of participants.

In some cases, the completed health matrix includes a composite score narration for one or more team attributes of the set of team attributes. The composite score narration may be an aggregation of one or more score narrations associated with the respective team attribute.

In some cases, the set of team attributes includes: a first attribute that is directed to team balance; a second attribute that is directed to team shared understanding; a third attribute that is directed to team goals; a fourth attribute that is directed to a team summary; a fifth attribute that is directed to team decision making; a sixth attribute that is directed to team managed dependencies; and a seventh attribute that is directed to team iterative improvement.

Some example embodiments are directed to a voice-activated networked system for producing an anonymized health matrix for a team of participants during a live meeting. The system may include a terminal device having a display that is configured to display a graphical user interface; a host service including a profile management server and an attribute library; and a voice interface system for facilitating the live meeting attended by the team of participants. The voice interface system may include a processing unit that is configured to obtain a set of team attributes from the attribute library of the host service. For each team attribute of the set of team attributes, the system may be configured to produce a synthesized speech prompt including a description of a respective team attribute of the set of team attributes; receive a participant score from each participant of the team of participants for the respective team attribute; receive a consensus voice input from the team of participants; and analyze the consensus voice input to determine a consensus score. The system may also be configured to receive a narration voice input from one or more participants of the team of participants; analyze the narration voice input to determine a score narration; determine a relevancy percentage for the score narration with respect to one or more of the set of team attributes; identify an associated team attribute for the score narration based on the relevancy percentage satisfying a criteria; generate the anonymized health matrix including a visual indicia for each consensus score associated with each team attribute of the set of team attributes; and transmit the anonymized health matrix and a set of score narrations to the profile management server, wherein each score narration of the set of score narrations is anonymized with respect to the team of participants.

In some cases, the voice interface system is configured to add the score narration to content from one or more other score narrations associated with the set of team attributes to create a composite score narration. The set of score narrations may include the composite score narration for the associated team attribute in the anonymized health matrix.

In some cases, the consensus score is displayed on the graphical user interface as a confirmatory visual indicia. The voice interface system may be configured to receive a confirmatory input from one or more of the team participants confirming the consensus score.

In some instances, the consensus voice input includes individual consensus voice input from each participant of the team of participants. The voice interface system may be configured to determine the consensus score based on the individual consensus voice inputs.

In some cases, the voice interface system is configured to identify one or more outlier individual consensus voice inputs. In some cases, the voice interface system is configured to provide at least one additional prompt to one or more participants associated with the one or more outlier individual consensus voice inputs. The voice interface system may be configured to receive at least one additional narration voice input in response to the at least one additional prompt. The voice interface system may be configured to solicit a subsequent consensus score in response to receiving the at least one additional narration voice input.

In some cases, the voice interface system is further configured to receive an inquiry voice input from one or more participants of the team of participants. In response to the inquiry voice input, the voice interface system may be configured to produce a responsive speech output that includes one or more of a description of the respective team attribute or an example of the respective team attribute.

In some cases, in response to the inquiry voice input, the voice interface system is configured to cause the graphical user interface to include at least a portion of one or more of the description of the respective team attribute or the example of the respective team attribute.

In some embodiments, the voice interface system is further configured to receive a selection of a type of team from a set of team types from a participant of the team of participants. The team of participants that is obtained from the attribute library depend, at least in part, on the type of team selected by the participant.

Some example embodiments are directed to a networked system for producing an anonymized health matrix for a team of participants during a live meeting. The system may include a terminal device having a display that is configured to display a graphical user interface; a host service including a profile management server and an attribute library; and a voice interface system for facilitating the live meeting attended by the team of participants. The voice interface system may include a processing unit that is configured to: cause the graphical user interface to display an initial health matrix, the initial health matrix including a set of team attributes obtained from the attribute library of the host service; produce a synthesized speech prompt including a description of each team attribute; receive a voice input including a request for one or more of: a definition or an example for one or more team attributes of the set of team attributes; receive a participant score from each participant of the team of participants for each of the set of team attributes displayed in the initial health matrix; receive a narration voice input from one or more participants of the team of participants; analyze the narration voice input to determine a score narration associated with a respective user score; determine a consensus score for a respective team attribute; generate a completed health matrix including a graphical item for each consensus score associated with each team attribute of the set of team attributes; and transmit the completed health matrix and a set of score narrations including the score narration to the profile management server, wherein each score narration of the set of score narrations are not associated with a specific participant of the team of participants.

In some example embodiments, determining the consensus score comprises: receiving a consensus voice input; determining a relevancy percentage for the consensus voice input with respect to multiple team attributes of the set of team attributes; and identifying a corresponding team attribute having a respective relevancy percentage that satisfies a criteria.

In some cases, the respective relevancy percentage is greater than other relevancy percentages that were determined with respect to other team attributes of the multiple team attributes. In some cases, graphical item includes a visual indicia having a distinctive shape or color that represents a graduated scale of the consensus score. In some cases, the completed health matrix includes only one consensus score for each respective attribute of the set of team attributes.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIGS. 3A-3C depict examples of a graphical user interface displayed on a terminal or client device.

The use of the same or similar reference numerals in different figures indicates similar, related, or identical items.

Figure 1:
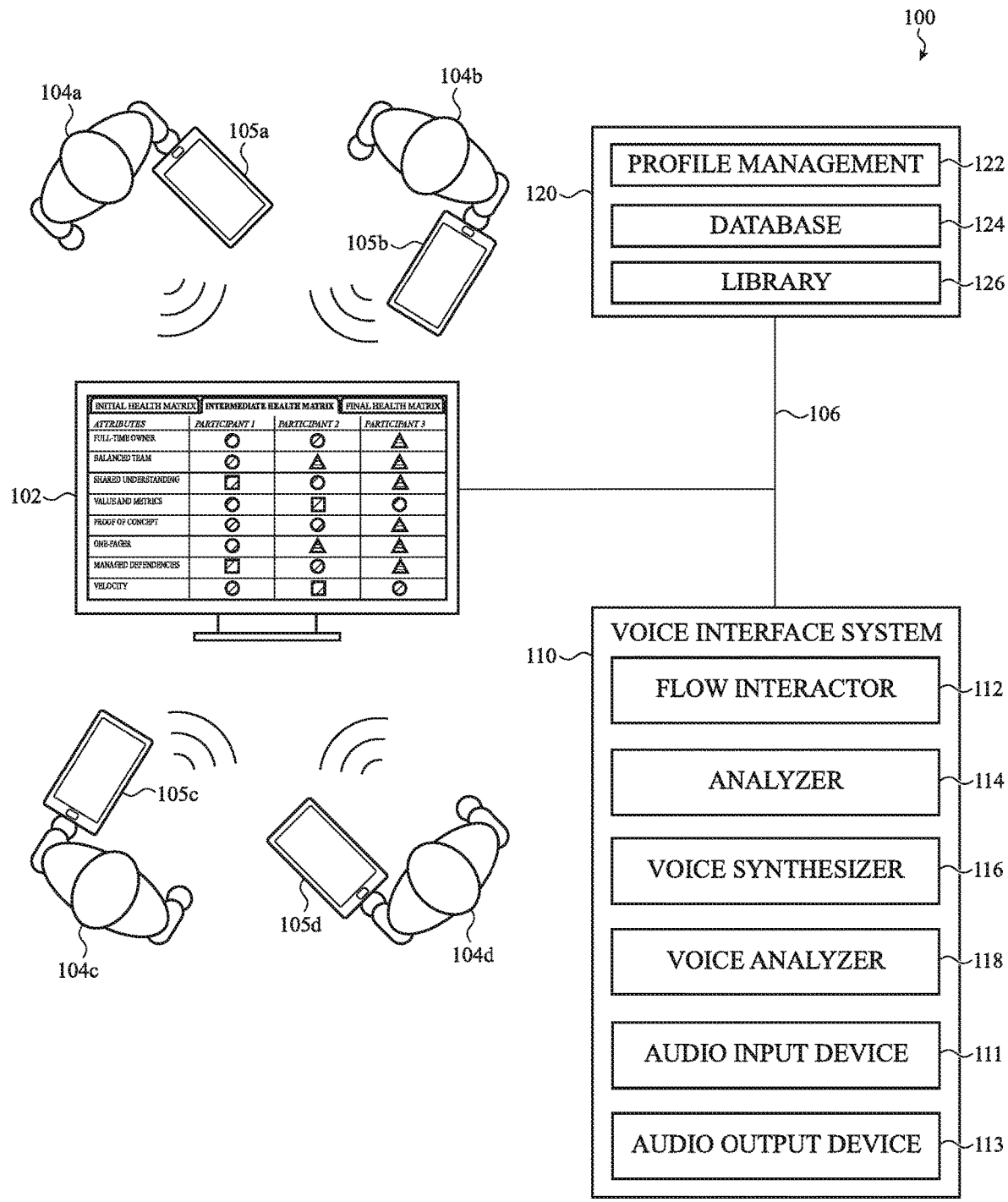
FIG. 1 is a schematic representation of a networked system having a voice interface system.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein are directed to systems and methods for a voice interface system that is adapted to facilitate a live meeting that is conducted in a structured or semi-structured format. The voice interface system may be adapted to provide a series of adaptive prompts that elicit the information needed to conduct the particular task or set of tasks. Voice input that is received from the meeting participants is analyzed by the voice interface system and used to initiate one or more actions to be performed with respect to a remote host service. By implementing a voice interface system as a local computer interface for a networked architecture, responsiveness and performance of the system may be improved without losing some of the benefits of having a distributed network architecture.

In some embodiments described herein, the voice interface system may be configured to facilitate a live health monitor meeting for developing and anonymously reporting team health metrics. High-performing teams may be a vital part of an organization or entity. However, even highly motivated and highly skilled professionals may have trouble analyzing and troubleshooting problematic team dynamics. Traditional teams may not even realize why the performance of the team is suffering and may not know how to begin to fix the problem. Even if issues are recognized, traditionally, troubleshooting may be left to individual team members that may attempt to fix or troubleshoot team dynamics by working directly with a supervisor or manager. However, issues with team dynamics may be complex and require the help and feedback of multiple team members in order to address them. Additionally, some individuals may hesitate to raise issues with a supervisor or manager, which may hide or bury problems that need to be addressed.

The systems and embodiments described herein may be directed to a voice interface system that is adapted to extract key feedback from a team, allow the team to reach a consensus on the key attributes, and then report the results of the meeting in a visual matrix so that the team's health and progress can be easily assessed and tracked. The system may be implemented over a distributed network having a remote host service that includes one or more health tracking servers and a database. The system may also use a local client or terminal device that operates the voice interface system and also generates a graphical user interface that is used to facilitate key aspects of the live meeting to demonstrate team health metrics and help establish consensus. By using a centralized host service that is accessible by a distributed network of voice interface systems, the content associated with the various key attributes may be consistent across enterprises and kept current to reflect changes to the attribute descriptions and additional content. The use of a voice-activated system that is implemented at least partially using localized hardware may improve the responsiveness of the system, which may improve the user experience and performance of the interface.

While the examples provided herein are directed primarily to a health monitor system, the voice interface system may also be adapted to facilitate other types of live meetings. For example, the voice interface system may be adapted to facilitate a team status meeting, project planning session, or other type of meeting having a structured or semi-structured format. In one example, the voice interface system is configured to operate within an issue tracking system that is adapted to monitor and track various issues or tickets that are associated with a project, story, or epic. As described herein, the issue tracking system may implement the voice interface system which may include a specially configured terminal device that includes an audio input device that is configured to receive voice input and an audio output device and voice synthesizer that is configured to output voice prompts or other synthesized speech audio. The voice interface system may also be operably coupled to an issue tracking server and be configured to identify one or more respective issues based on a voice input from a meeting participant. As described herein, the voice interface system may be adapted to determine a relevance percentage for a given voice input and, based on the relevance percentage, identify one or more potential relevant issue records to be modified. In some cases, the voice interface system may also be adapted to create a new issue if the voice input corresponds to a story or epic description and also does not have an adequate relevance percentage match with an existing issue record.

The embodiments described herein may be used to conduct or facilitate a live meeting with multiple participants that are attending either physically or virtually through a telephone, video, or other form of remote conference. The systems and techniques described herein are directed to a voice interface system that may be more than a system that receives voice commands. The voice interface system may be configured to facilitate or direct a meeting of human participants and is configured to interact with meeting participants as a member of the meeting and/or as a meeting leader. The voice interface system may be adapted to identify relevant discussion points, extract key data from a live discussion, and provide graphical charts, updates, and other outputs in accordance with the live discussion. The voice interface system may also be adapted to identify participants, match participants with feedback, and provide further prompts or information in response to voice input provided from particular participants.

In accordance with some embodiments described herein, the voice interface system may use a predictive model that has been constructed using a machine learning or other analytical modeling tool that has been trained using previous meeting interactions and/or a given training set of data. In particular, the model may be adapted to draw a correlation using a set of key words or other extracted content to one or more key attributes used to determine the health of a team or group. In some cases, the model may be adapted to draw a correlation between a set of key words and one or more items, records, issue records, or other items stored in the system. The model may be initially trained using a set of example keywords and template records or example stored items. However, over time, through confirmations provided through the voice interface system, the model may be enhanced and the reliability of the recommendations improved.

In accordance with some embodiments described herein, the voice interface system may be adapted to provide one or more graphical prompts to the participants of the meeting. The prompts may be displayed on a shared terminal device that is viewable by the entire team or group or, alternatively, some prompts may be directed to individual user's client devices that are running or executing a client application. In some cases, the prompts are used to receive feedback from the participants about one or more decisions or inferences made by the voice interface system. In some cases, the prompts provide the participant one or more options to select from to either confirm or correct an action or proposed action to be taken by the voice interface system, which may be used as feedback to dynamically update the analysis model or predictive learning elements of the system. The graphical prompts may be used to resolve potential conflicts or multiple matches identified by the system. The graphical prompts may also be used to confirm selections or recommendations made by the system, which may be used as feedback for the system.

In accordance with some embodiments, the voice interface system may also be adapted to generate a log or summary of meeting activity. In particular, the voice interface system may generate one or more reports, including a health monitor matrix or summary. The health monitor matrix may include content that was obtained during the live meeting but has been anonymized to abstract the content from a particular individual or disassociated with the contributor. The voice interface system may also be configured to produce a meeting log or summary of meeting actions, which may or may not be anonymized. The meeting log or meeting summary may include a summary of edits or changes made to a set of respective items being handled by the host system, which may include attribute feedback, issues, issue records and other items discussed during the course of the live meeting. The log may be organized by issue or, in some embodiments, may be organized by user. The log may also be filtered to remove minor changes or updates and include only changes in issue status and the creation of new issue records.

As used herein, the terms "health monitor system" or "health monitor" may be used to describe a system that is specially configured to monitor and report the health of a project team or other group of individuals using a health monitor report or other type of feedback. The health monitor system may be defined by one or more services provided by a host system or other central server, which may also have access to records and health monitor historical data that is stored on a database or other repository. The health monitor system may include a diagnostic that may be performed or conducted through a live meeting, as described herein. The health monitor system may also be adapted to interface with an issue tracking system in order to initiate or create issues to be addressed or resolved as a result of a health monitor diagnostic meeting.

An issue tracking system, as described herein, may be used to refer to a project management tool that may be specially configured for tracking issues and tasks that are associated with a software development project. As described herein, an issue tracking system may be used to refer to a project management tool that can be implemented in whole or in part as software executed by a virtual or physical server or other computing appliance that provides a team of individuals with a means for documenting, tracking, and monitoring completion of work as discrete tasks related to completion, development, or maintenance of a defined project or goal. In many examples, an issue tracking system is configured for use by a software development team to track completion and assignment of discrete tasks related to software development projects from creation of new user stories or epics (i.e., user-perspective feature requests or desired functionality), through proof of concept testing, through integration testing, through release of software to one or more users, and through reporting and fixing of software errors ("bugs"). In other cases, an issue tracking system can be configured for non-software tracking purposes, such as for use by a human resources team, an information technology support group, and so on.

An issue tracking system, as described herein, may increase the efficiency of a team of individuals working on a common goal or project by facilitating the organization of the assignment of discrete items of work to the individual or team of individuals most suited to perform that work. More particularly, each item of work tracked by an issue tracking system is referred to as an "issue" that is typically assigned to a single individual to complete. Example "issues" can relate to, without limitation: a task to identify the cause of a software bug; a task to perform a feasibility assessment for implementation of a new feature; a task to fix an identified software bug; and so on.

For purposes of the following disclosure, the terms "issue report," "issue," and "ticket" may be used to generally refer to an issue or item that is being tracked by the system. More specifically, the term "issue request" is generally used to describe input provided by a user to an issue tracking system that may result in a creation of an "issue record." As used herein, the term "issue record" may be used to refer to a discrete database record associated with an issue or item being tracked by an issue tracking system. As used herein, an issue record may correspond to a discrete task or set of tasks to be accomplished by the one or more assignees. The issue record may include a description of the tasks to be completed, a status, a time estimate, complexity, and other descriptive attributes. An issue record may also correspond to a story or an epic, which may relate to a long-term goal or set of product features to be developed. Although not required, an issue record can be stored, at least temporarily, in a database accessible to an issue tracking system. While these terms are used herein with respect to specific examples and potential implementations, it may be appreciated that these are merely examples and other embodiments can be configured to receive, anticipate, predict and/or recommend additional or alternative data, user inputs, or issue requests or issue records associated with an issue tracking system.

These foregoing and other embodiments are discussed below with reference to FIGS. 1-7. However, those skilled in the art will readily appreciate that the detailed description given herein with respect to these figures is for explanatory purposes only and should not be construed as limiting.

FIG. 1 depicts a schematic diagram of an example implementation of health monitoring system 100 also referred to herein as simply system 100. In particular, FIG. 1 depicts a health monitoring system 100 including a voice interface system 110 that is operably coupled to a host service 120 by a network 106. The voice interface system 110 may facilitate a live meeting attended by the meeting participants 104a-d and conducted in accordance with a predefined or semi-structured format. As described herein, the live meeting may be a health diagnostic meeting, a project status meeting, or other type of meeting that may be conducted in a semi-structured format. In general, the voice interface system 110 is adapted to provide more than a response to voice commands during a live meeting. The voice interface system 110 may be adapted to participate in the live meeting as a member or participant and, in some cases, the voice interface system 110 is adapted to lead or direct the live meeting and may identify relevant discussion points and/or extract key data from the live discussion among the participants 104a-d. In some implementations, the voice interface system 110 is also adapted to identify high-level or important issues that were discussed and actions that were taken during a live meeting and provide a summary or meeting notes summarizing the live meeting.

As shown in FIG. 1, the voice interface system 110 may be operably coupled to a host service 120 via a network 106. The host service 120 may include one or more profile management server(s) 122, one or more databases 124, and one or more libraries 126. The profile management server(s) 122 may be generally configured to monitor and track a project team or groups of health diagnostics. The profile management server(s) may also be adapted to serve as a central repository or source for meeting content including, for example, key attributes, attribute descriptions, heath diagnostic tools, and other content.

In some cases, the host service 120 may also include one or more issue tracking server(s) that are generally configured to store, track, and modify groups of issue records that are associated with various projects or tasks that are performed by different teams. A distinct set of issue records may be associated with a particular project or team which is the subject of the live meeting. In accordance with some embodiments, one or more issues or issue records may be created or initiated as a result of a health diagnostic performed during the live meeting. The voice interface system 110 may be adapted to receive audio from one or more of the participants 104a-d of the live meeting and identify a set of issue records that is predicted to be relevant to one or more topics discussed during the live meeting.

In general, it may be beneficial to have the participants 104a-d located in the same geographic location (e.g., a common meeting room or meeting space) in order to facilitate an open discussion. However, it is not necessary that all of the participants 104a-d be physically collocated. In accordance with some embodiments, one or more of the participants 104a-d may be attending the meeting via teleconference, video conference, or using another remote conferencing system to attend the live meeting. In some cases, the live meeting may be conducted with one or more of the participants 104a-d participating through a respective terminal device operating a teleconference or other virtual meeting service or through a client device that is running or executing a client application that facilitates their remote attendance and participation.

As described herein, the system 100 includes a voice interface system 110 that has been configured to facilitate a heath monitor, health diagnostic, or team diagnostic live meeting. As described herein, the terms heath monitor meeting, health diagnostic meeting, or team diagnostic live meeting may be used interchangeably and may generally be referred to as a "health monitor meeting." The voice interface system 110 may also be configured to conduct a project update meeting, issue status update meeting, or other type of live meeting that has a structured or semi-structured format. The voice interface system 110 may have one or more elements like the flow interactor 112 and/or the flow analyzer 114 that are adapted to conduct the particular type of meeting.

In one example the system 100 is configured to conduct a health monitor meeting that is used to generate a health report (e.g., a health matrix) or other output, such as described herein. Example reports are described below with respect to the examples of FIGS. 3A-3C. As shown in FIG. 1, the meeting may be facilitated by a voice interface system 110 that is configured to modify a display of a terminal device 102. As shown in FIG. 1, the terminal device 102 may display a graphical user interface, which includes a set of key attributes, attribute descriptions, and the various forms of feedback received from the group of participants 104a-d including, for example graduated scoring, score narratives or explanations, and other content.

The voice interface system 110 may facilitate the meeting and conduct the health diagnostic in accordance with content provided on one or more profile management server(s) 122 of the host service 120. In some cases, profile management server(s) 122 include an example meeting flow or scheme that is downloaded to the flow interactor 112 of the voice interface system 110. The profile management server(s) 122 may also provide content for the meeting including, for example, a special meeting flow depending on the type of meeting selected, special sets of key attributes for the health meeting depending on the type of meeting selected, attribute descriptions, meeting instructions, and other content that may be delivered to the group of participants 104a-d by the voice interface system 110.

In the example of FIG. 1, the graphical user interface of the terminal device 102 may be modified by the voice interface system 110 in accordance with the discussion and/or the flow of the health monitor meeting to help give visual cues to the participants 104a-d. The graphical user interface may, for example, display content associated with a health monitor matrix, similar to those described below with respect to FIGS. 3A-3C. Additionally or alternatively, the voice interface system 110 may modify or control the graphical user interfaces of the client devices 105a-d. The graphical user interfaces of the client devices 105a-d may display shared content, similar to the display of the terminal device 102. In some instances, the client devices 105a-d may display content that has been tailored for the respective participant 104a-d. For example, the client devices 105a-d may be used to display voting options and to receive a voting input and/or scoring input from the respective participants 104a-d who may be conducting a blind vote in accordance with the meeting flow.

As shown in FIG. 1, the voice interface system 110 may include various elements or components that may be adapted to perform the various functions associated with the voice interface system 110. In the present example, the voice interface system 110 includes an analyzer 114 and a flow interactor 112 that are adapted to extract data or content from live discussion provided during the meeting and identify one or more relevant attributes or matrix elements that are associated with the content of the discussion. The flow interactor 112 generally includes configurable components including rulesets for facilitating a particular type of meeting or meeting structure. For example, with respect to some of the embodiments described herein, the flow interactor 112 may be adapted to facilitate a health monitor meeting in which candid feedback about the team is collected and one or more reports generated using the voice interface system 110. In other examples, the flow interactor 112 may be configured to facilitate a status update meeting, team planning session, issue tracking meeting, or other type of meeting having a distinct flow or format. The flow interactor 112 may also be configured to facilitate brainstorming meetings, group collaboration meetings, board meetings, or any other structured or partially structured meeting format.

In general, the flow interactor 112 includes a template flow for the live meeting that is conducted in accordance with a ruleset or meeting guidelines. In one example, the flow interactor 112 includes a configurable module that is adapted to conduct a meeting in accordance with the processes described below with respect to FIG. 5. While these are provided as sample illustrating examples, there are other meeting formats or structures for which the flow interactor 112 may be configured to facilitate.

The flow interactor 112 may be coupled to an analyzer 114, which may include a model that has been trained to analyze a data stream and identify one or more commands, actions, or tasks to be performed by the voice interface system 110 based on a received audio input. The analyzer 114 may be adapted to perform semantic analysis, syntax analysis, tokenization, and other language processing functions. As described herein, the analyzer 114 may include a machine learning algorithm that includes a Bayesian network, nodal network, or other predictive model that has been trained to correlate a text string or dataset with a particular command, task, action, or other function that is recognized by the profile management server(s) 122 of the host service 120. The analyzer 114 may have a hard-coded model that remains static with use or, alternatively, the analyzer 114 may adapt or modify the model over time to respond to common use cases and/or feedback received from the meeting participants 104a-d or other system users.

The flow interactor 112, alone or in conjunction with the analyzer 114, may be configured to identify one or more key team attributes that are stored in the database 124 associated with the profile management server 122. The flow interactor 112 may work in conjunction with the analyzer 114 to interpret speech and voice commands received during a live meeting in order to collect feedback from the team and update the profile management server(s) 122, which may store anonymized reports and other anonymized content that has been developed during the live meeting. The flow interactor 112 may also work in conjunction with the library 126 of the host service 120, which may include high-level data, modal graphs, and other structural data that can be used to navigate and locate the attributes, team health statistics, and other records stored in the database 124 of the host service 120.

The analyzer 114 and/or the flow interactor 112 may be configured to receive an analyzed dataset (e.g., a text string) that is based on audio received from the voice analyzer 118. The analyzer 114 may be configured to further analyze the dataset received from the voice analyzer 118 to extract key terms and/or phrases. The analyzer 114 may, in some instances, be configured to perform natural language processing in order to remove common terms or other language that may not be unique to the topic being discussed. The analyzer 114 may perform further processing in order to identify one or more of: a topic being discussed, a user being discussed, an activity associated with the topic, or an action to be performed.

The analyzer 114 may analyze the dataset using one or more natural language processing tools. For example, the dataset may be analyzed (and, optionally, normalized, lemmatized, parsed, segmented, part-of-speech tagged, stemmed, or otherwise preprocessed) to determine whether statistical inferences can be derived from the dataset. In one embodiment, text content derived from, or otherwise obtained from, audio received during the live meeting (as processed by the voice analyzer 118) can be segmented by words, phrases, or sentences to determine which content occurs most frequently. In many examples, text content from, or otherwise obtained from, the dataset and predicted to not be unique to a current topic of discussion can be likewise segmented by words, phrases, or sentences and extracted or ignored. In some implementations, the analyzer 114 may include a semantic analysis engine to identify specific phrasing or sentence structure that may include a specific action or type of input that is provided; leverage a text preprocessing analysis engine to tokenize, lemmatize, normalize, or otherwise simplify words of the voice input, to remove certain characters or phrases (e.g., newlines or stop words), and so on in order to generate a bag of words, bag of parts of speech, or any other numerical statistic(s) or metadata (e.g., length of text, number of sentences, number of tokens, lemma types) that may be compared to a database of previously-identified actions or commands.

The analyzer 114 may include or use a predictive model that may be adapted to extract or infer patterns within the dataset or text received from the voice analyzer 118. For example, the analyzer 114 can utilize any number of suitable techniques to identify signals of such patterns. Examples include, but may not be limited to, techniques including or leveraging: classification algorithms; supervised learning algorithms; probabilistic classification algorithms; Bayesian analysis algorithms; support vector machines; neural networks; deep-learning algorithms; decision trees; natural language processing algorithms; hierarchies of experts; Kalman filters; entropy-based models; and the like.

In this manner, a set of terms and phrases (collectively, herein "keywords" also referred to as a dataset or analyzed text) can be created by the analyzer 114 in which certain keywords used in a current discussion topic are associated with a statistical likelihood that a related attribute or matrix topic should be associated with the content being discussed. The analyzer 114 may, in cooperation with the flow interactor 112 and the profile management server(s) 122 of the host service 120, identify one or more team attributes or other content to be viewed and/or modified in accordance with the topic being discussed. Similarly, the analyzer 114, in conjunction with the flow interactor 112, may determine or compute a statistical likelihood that no key attribute or topic exists and may either create a new attribute or topic, or may associate the content with general or miscellaneous feedback to be included with the health monitor report.

The flow interactor 112 and/or the analyzer 114 may, in some cases, be operably coupled to the attribute library 126 of the host service 120 in order to identify corresponding content stored in the database 124 associated with the profile management server(s) 122. In one example, the flow interactor 112, alone or in conjunction with the analyzer 114, analyzes the data stream received from the voice analyzer 118 in order to identify one or more keywords, phrases, or other attributes of the live discussion. The flow interactor 112, in conjunction with the attribute library 126, may determine a similarity score, similarity metric, or other criteria with respect to the attributes of the live discussion and one or more attributes or other content that has been stored in the database 124. The content may be temporarily downloaded to the voice interface system 110 in order to reduce latency or response time. The similarity score may be a composite of multiple correlations including one or more of the following: a correlation between the speaker in the live meeting and a user listed in the health matrix; a correlation between a keyword extracted from the dataset and a description or title of a key team attribute; a correlation between a keyword or topic extracted from the dataset and a name or description associated with a key team attribute or other matrix content. The flow interactor 112 may determine a composite metric based on these factors and, in response to the metric satisfying a threshold, relevant content of the matrix in which to associate the voice input. The graphical user interface of the terminal device 102 may be modified to display content associated voice input and the associated location in the health monitor matrix.

As shown in FIG. 1, the terminal device 102 may display content associated with one or more issue records identified by the voice interface system 110. The content may include a set of graphical elements or objects that corresponds to the various elements of the health monitor matrix being discussed during the live meeting. Through the voice interface system 110 the content associated with the one or more attributes, attribute scores, votes, scoring narratives, and other content may be modified and displayed on the terminal device 102 and/or one or more of the client devices 105a-d. Additionally, the content that is collected and/or created by the voice interface system may be used to generate one or more anonymized health matrix reports or other output content, which may be transmitted and/or stored by the profile management server(s) 122 of the host service 120. Depending on the implementation, the content may be modified through a series of vocal interactions with the voice interface system 110 and/or through interactions with the graphical user interface using a traditional mouse and keyboard.

In the present embodiment, the voice interface system 110 includes a voice analyzer 118 that may be operably coupled to the audio input device 111, which may include a microphone and/or other audio sensors that are configured to receive an audio or acoustic input. The voice analyzer 118 may be operably coupled to the audio input device 111 and may be configured to receive and process an audio stream captured by the audio input device 111 during the live meeting. In some implementations, the voice analyzer 118 receives the audio stream from a computer memory component that temporarily stores the audio stream before processing. The voice analyzer 118 includes one or more voice-to-text hardware and/or software elements that are adapted to convert an audio stream or signal into a dataset that includes text and, optionally, other elements. In some implementations, the voice analyzer 118 includes a signal processing element that may be configured to reduce background noise and/or enhance various characteristics of voice elements in the audio stream. The signal processing may occur using hardware elements that include low-pass filters, high-pass filters, bandpass filters, modulators, amplifiers, and the like. The signal processing may also occur, at least in part, using one or more digital signal processing techniques or elements.

The voice analyzer 118 may also include one or more modules or components that are adapted to convert an audio stream or signal into a dataset that includes text elements. The audio stream or signal may be preprocessed or otherwise conditioned prior to being converted by the respective modules or components of the voice analyzer 118. In some embodiments, the voice analyzer 118 calls or implements a tool that includes a Hidden Markov Model (HMM) that divides the audio stream or signal into fragments for which one or more coefficients or vectors are computed. The series of coefficients or vectors may be matched to one or more phonemes or units of speech, which may be used to determine corresponding text. In some cases, the voice analyzer 118 implements the voice-to-text processing locally in the voice interface system 110. In other cases, the voice analyzer 118 may utilize one or more remote modules or computing systems to perform the voice-to-text computations and analysis. The voice analyzer 118 may include one or more modules or software developer kits that implement one or more of the voice-to-text protocols or elements. The voice analyzer 118 may perform the voice-to-text processing using a synchronous, asynchronous, streaming, or other architecture for processing the audio received from the audio input device 111.

In the present embodiment, the voice interface system 110 includes a voice synthesizer 116 that may be operably coupled to the audio output device 113, which may include a speaker or other hardware elements that are configured to produce an audible or acoustic output. The voice synthesizer 116 may be configured to receive text or other input and produce an audible speech output using the audio output device 113. In some implementations, the voice synthesizer 116 is operably coupled to the flow interactor 112, which outputs a dataset or text string that is to be configured to human audible speech. The voice synthesizer 116 may include one or more text-to-speech (TTS) components that are configured to convert a text string into an audio signal that is recognizable by a user as speech. The voice synthesizer 116 may include a combination of hardware and software elements that perform TTS operations. For example, the voice synthesizer 116 may include one or more models, such as a Hidden Markov Model (HMM) or a neural network that is specially configured to determine suggested words and pronunciation in the text stream. The voice synthesizer 116 may also include one or more sound synthesis elements that are configured to construct a series of phonemes that can be used to produce the audio speech output. The voice synthesizer 116 may include one or more modules or software developer kits that implement one or more of the TTS protocols or elements. The voice synthesizer 116 may also include various amplifiers, signal conditioning elements, or other hardware components that are used to produce the audio signal that is sent to the audio output device 113 to produce the speech output.

FIG. 1 represents one schematic representation of system 100 having a networked or cloud-based architecture. In the illustrated embodiment, the system 100 is implemented with a client-server architecture including a host service 120 that communicably couples (e.g., via a network 106 that includes one or more networking or wired or wireless communication protocols) to the voice interface system 110 and the terminal device 102. The host service 120 may also be operably coupled (via the network 106) to one or more client devices 105a-d that are associated with or operated by the meeting participants 104a-d. It may be appreciated that other client devices, terminal devices, workstations, or other devices may be configured in a substantially similar manner as the client devices 105a-d, although this may not be required of all embodiments and different client devices can be configured differently and/or may transact data or information with, and/or provide input(s) to, the host service 120 in a unique or device-specific manner.

The voice interface system 110 may be implemented on a computing platform that includes a processor or a processing unit, volatile or non-volatile memory (identified, collectively, as the memory), and a display. An example voice interface system is described below with respect to FIG. 5. In some cases, the voice interface system 110 and the terminal device 102 are implemented on a shared computing platform and, in some cases, may operate using shared hardware components. In some implementations, the voice interface system 110 and/or the terminal device 102 are implemented on a laptop computer, desktop computer, virtual workstation terminal, or other computer hardware platform.

The client devices 105a-d can be any suitable personal or commercial electronic device and may include, without limitation or express requirement, a processor or processing unit, volatile or non-volatile memory (identified, collectively, as the memory), and a display. Example electronic devices include, but are not limited to: laptop computers; desktop computers; cellular or mobile phones; tablet computing devices; and so on. It may be appreciated that client devices 105a-d, such as described herein, can be implemented in any suitable manner.

In many embodiments, the processor of the client devices 105a-d can be configured to execute an application (herein referred to as a "client application" or an "issue tracking client application") that is executed or run using the processor or processing unit of the client device and may be stored, at least in part, in the memory. The client application may include a graphical user interface that is configured to display content that is generated by the host service 120 and/or the voice interface system 110. The client application may also be configured to produce a graphical user interface that is configured to receive a graduated or scaled score, score narrative, vote, or other input related to the health monitor meeting from the user of the client device. The client application may also be configured to produce a graphical user interface having a set of fields or other template for receiving user input regarding an issue request or ticket. The client application is configured to access and communicate with the host service 120 and to securely transact information or data with, and provide input(s) to, the host service 120. In some embodiments, the client application may be a browser application configured to access a web page or service hosted by the host service 120 that is accessible to the client devices 105a-d over a private or public network that may, in some embodiments, include the open internet. The client application may be configured to display the graphical user interface through the browser and/or a dedicated issue tracking software application. In some cases, the graphical user interface is adapted to the display of the client device and may be presented in a mobile format or full format depending on the size and/or resolution of the client device display.

As shown in FIG. 1, the host service 120 includes a library 126, which may store content associated with the health monitor system or used to conduct a health monitor meeting. The library 126, also referred to herein as an attribute library, may have content that is stored in the database 124 and may include one or more indexes, catalogs, or other organizational tools that may be used to identify and/or retrieve content stored on the database 124. The library 126 may include one or more key attribute descriptions, instructions, meeting flows, or other content that may be used to customize the health monitor meeting for a particular group or set of participants 104a-d.

In many embodiments, the host service 120 is configured to operate within or as a virtual computing environment that is supported by one or more physical servers including one or more hardware resources such as, but not limited to (or requiring) one or more of: a processor or processing unit; a memory; non-volatile storage; networking connections; and the like. As used herein, a processor of the host service 120 may refer to one or more physical processors or processing units implemented on one or more physical computing systems that, alone or together, can be configured to implement the functionality described herein. The host service 120 may be implemented on a single computing system or using a distributed network of computing systems. For simplicity of description and illustration, the various hardware configurations associated with a processor, computing device, or hardware architecture are not shown in FIG. 1. Hardware aspects of the host service 120 may correspond to the hardware of the voice interface system 110 described below with respect to FIG. 5. In general, the hardware of the host service 120 may be distributed across multiple servers or physical computing devices in order to allow for scalability and remote access from a variety of geographic locations.

In many embodiments, the host service 120 and the voice interface system 110 can include a number of discrete subservices or purpose-configured modules, containers, or virtual machines each configured to perform, coordinate, serve, or otherwise provide one or more services, functions, or operations of the host service 120 or the voice interface system 110. Example operations include the capture and analysis of audio during a live meeting; determine a relevance percentage for one or more key team attributes, matrix content, issue records, or other content used by the voice interface system 110 or stored in the database 124 of the host service 120; prompt the meeting participants for voice input; and modify heath monitor content in accordance with received voice input. In the example of FIG. 1, the host service 120 includes one or more profile management server(s) 122, which may be used to track the information related to particular teams, team configurations, historical health monitor content, and other information associated with the system 100. As described above, profile management server(s) 122 may be operably connected to (or may include) one or more database(s) 124 that are used to store the data and other information used by the profile management server(s) 122. As described herein, the system 100 also includes a voice interface system 110 having various elements that are configured to serve as the interface between the participants 104*a-d* of the live meeting and the profile management server(s) 122 of the host service 120. Specifically, the voice interface system 110 may be configured to perform one or more of the operations described below with respect to the examples of FIGS. 2-3C, as described in more detail below.

Figure 2:
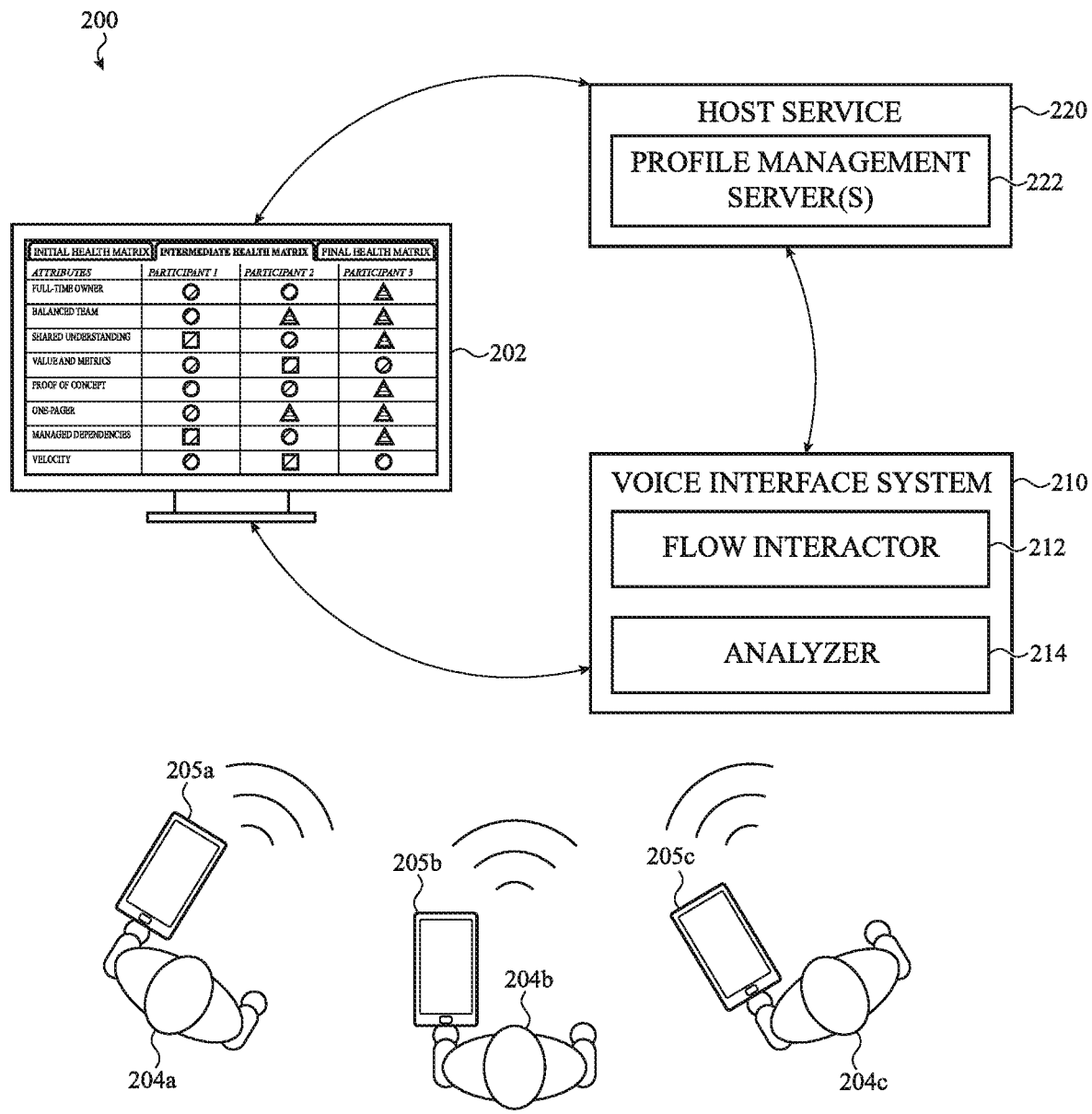
FIG. 2 is a signal flow diagram of a networked system having a voice interface system.

FIG. 2 depicts an example process flow for a health monitor system 200. The process flow of FIG. 2 may correspond to any or all of the example embodiments described herein. Further, the actual process flow of any particular health monitor system may include elements not included in the example of FIG. 2, which is a simplified illustration.

As shown in FIG. 2, a terminal or client device 202 may run or execute a client application that generates a graphical user interface. The graphical user interface may allow the user to view and manipulate content associated with a health matrix, as described herein. As shown in the simplified example of FIG. 2, the graphical user interface depicted on the terminal or client device 202 includes graphical elements that correspond to a set of team attributes, which may be discussed and modified during the course of a live meeting or event. (Other examples of a graphical user interface are provided in FIGS. 3A-3C, discussed below.) In general, the graphical user interface may allow the user to perform one or more manipulations including, for example, individual attribute scoring, entry or editing or score narratives, team consensus scoring, and other edits to the health matrix as a result of the live meeting.

As shown in FIG. 2, the terminal or client device 202 is operably coupled to a voice interface system 210. The terminal or client device 202 may be operably coupled to the voice interface system 210 by a network connection or other electronic communication scheme. The voice interface system 210 may include many or all of the elements or components described above with respect to the example of FIG. 1 including, for example, a flow interactor 212, an analyzer 214, an audio input device, an audio output device, a voice synthesizer, a voice analyzer, and other components. A description of these elements or components is not repeated for clarity and to reduce redundancy. The terminal or client device 202 is also operably coupled to a host service 220, which may include one or more profile management server(s) 222, databases, and models, as described above with respect to FIG. 1. Again, redundant description of the various components of the host service 220 are omitted for clarity.

In an example embodiment, the voice interface system 210 is configured to facilitate a live meeting with a group of participants 204*a-c*. While the participants 204*a-c* are depicted as being located in a shared geographic location (e.g., in a common meeting room or meeting space), it is not necessary that all of the participants 204*a-c* be physically collocated. In accordance with some embodiments, one or more of the participants 204*a-c* may attend the meeting via teleconference, video conference, or using another remote conferencing system to attend the live meeting. Such remote attendees may be considered attending participants for purposes of the embodiments described herein.

The system 200 may be used to conduct or facilitate a live meeting. In particular, the system 200 may be configured to facilitate a health diagnostic or health monitor meeting in order to receive candid feedback on the performance of the team with respect to a select set of criteria as described in a set of team attributes. As described herein, a voice interface system 210 may be used to facilitate the meeting by prompting participants 204*a-c*, causing the display of the client device 202 to show relevant content, and conducting the meeting in a way that is both structured is format but also in a natural or human-seeming way. The voice interface system 210 may also provide a summary of actions or modifications performed or score narratives, which may serve as meeting notes or a transaction log for reference later by the participants or to notify users not attending the live meeting.

In one example, the terminal or client device 202 may launch the graphical user interface, which may be generated by a client application that is executed or running on the client device 202. The client application may include a dedicated client program and/or be implemented as a web-based interface through a browser or other web-based tool. The content displayed on the graphical user interface may include graphical elements or objects that correspond to content associated with the set of attributes that is obtained from the profile management server 222 or library of the host service 220.

In the example of FIG. 2, the terminal or client device 202 is depicted as being separate from the voice interface system 210. However, in some implementations, the voice interface system 210 may be implemented on or integrated with the terminal or client device 202. As described previously, the voice interface system 210 and the terminal or client device 202 may have shared hardware or may be implemented on the same hardware platform. In some cases, the voice interface system 210 may be referred to generally as a terminal device, a client device, or other device or system.

The terminal or client device 202 may be adapted to prompt the team or group to receive individual scores and/or feedback with respect to each attribute displayed on the terminal or client device 202. In some implementations, the meeting may be initiated though a voice input, voice command, or other input to the system 200 that requests the initiation of a health monitor meeting. The voice input may include a request to begin the meeting and, in some cases, include an indication of the type of team that is being evaluated. For example, one or more of the participants 204*a-c* may request the initiation of the live meeting and also include context for the type of team that will be evaluated. For example, one or more of the participants 204*a-c* may announce (e.g., "Let's start the health monitor meeting for the western-area sales and marketing group"), which may be detected by the voice interface system 210. In accordance with the example provided above with respect to FIG. 1, the voice interface system 210 may include a voice analyzer that is configured to convert detected audio or speech to text and an analyzer 214 that is configured to recognize or identify commands or actions within the converted text. The analyzer 214 may be adapted to identify a tokenized or predefined action that corresponds to content extracted from the voice input. In response to an announcement of the name of the team being evaluated, the voice interface system 210 may communicate with the host service 220 to identify a relevant set of team attributes and attribute content and, in some cases, may cause the profile management server 222 of the host service 220 to transmit content to the terminal or client device 202 and/or the voice interface system 210. The graphical user interface may be modified to display graphical objects that include content associated with the respective set of attributes, which may be displayed in an initial health matrix. An example initial health matrix is described below with respect to FIG. 3A.

After the set of respective team attributes and associated content have been identified, the voice interface system 210 may be adapted to query or prompt respective participants for input related to the set of attributes. In one example, the voice interface system 210 is configured to address each of the attributes one-by-one with the meeting participants 204a-c. This functionality may be directed by the flow interactor 212, which may be configured to conduct a particular meeting flow or progression. In one example implementation, the flow interactor 212 of the voice interface system 210 may be adapted to select a respective attribute and prompt each participant for a response. The response may be provided as voice input or as user input to a corresponding client device 205a-c. For example, the response may be a blind vote that includes a score corresponding to the respective attribute, which may be entered using a graphical user interface being displayed on a respective client device 205a-c. In another example, the response may be a voice input that is provided by one or more of the meeting participants 204a-c. In some cases, the flow interactor 212 may be adapted to identify an assignee by name and request a brief narrative that may be associated with the respective attribute of the health matrix. In some cases, the flow interactor 212 is configured to provide additional content associated with one or more of the attributes in response to voice input provided by the participants 204a-204c In some implementations, the flow interactor 212 of the voice interface system 210 may be adapted to present a series of audio prompts (e.g., synthesized speech prompts) that are specially adapted to extract key details about feedback related to one or more of the team attributes from the group of meeting participants 204a-c. For example, the voice interface system 210 may be configured to produce a series of synthesized speech prompts for each team attribute to be discussed during the live meeting. The series of prompts may be adapted in accordance with content associated with the respective attribute being discussed. For example, the attribute may include a main description and one or more examples. The flow interactor 212 of the voice interface system 210 may be configured to extract content from the description and/or examples in order to customize or adapt the prompts to correspond to the subject matter being discussed.

While in some embodiments the voice interface system 210 is configured to provide explicit speech prompts to obtain feedback or a narrative for a specific attribute, in some embodiments the voice interface system 210 may be configured to receive voice input from a general discussion and determine a corresponding attribute for which the input should be associated. For example, in one embodiment, the voice interface system 210 may provide a generic speech prompt that requests feedback or a narrative from one or more of the participants 204a-c. In response, the one or more participants 204a-c may provide an audible input that includes a brief narrative with respect to a particular attribute or quality of the team. The analyzer 214 (receiving a dataset or text from a voice analyzer or other voice-to-speech converter) may be adapted to analyze extracted content from the voice input and, either alone or in combination with the flow interactor, determine or classify the input as being associated with one or more of the attributes of the matrix. The analyzer 214 may include a predictive model (implemented using a Bayesian network or other machine learning tool) that is adapted to recognize elements of the voice input, such as the verb tense, time elements, and sentence structure, which may be used to classify the voice input.

In one example implementation, the flow interactor 212 or other element of the voice interface system 210 may be adapted to identify a relevant attribute from the set of attributes being discussed during the live meeting. For example, the flow interactor 212 may be adapted to determine a relevance percentage for extracted content or a dataset with respect to content associated with an attribute of the health matrix. The flow interactor 212 may determine a separate relevance percentage for each of the attributes and select or identify a relevant attribute based on that attribute having the highest relevance percentage vis-a-vis the extracted content or dataset. In other embodiments, the flow interactor 212 is adapted to select or identify one or more relevant attributes in response to the respective relevance percentage exceeding a threshold. The relevance percentage and/or the threshold may be dynamic and may be adjusted in accordance with user feedback or through feedback received due to repeated use and various positive (or negative) outcomes.

The relevance percentage may be computed any one of a number of different ways. In one example, the relevance percentage is a numerical quantification of a degree of correlation between content extracted from the voice input and text of the respective issue record. In some instances, the correlation is weighted to increase the score when unique or non-common terms (e.g., names, places, products) have a correlation (as compared to common articles, verbs, and other commonly used terms). While it is not necessary, the relevance percentage may be measured on a scale of 0% to 100%. In some implementations, the relevance percentage is a relative measure of a correlation or similarity between extracted content and content of the issue record, which may be represented by any appropriate numerical quantity. For ease of use, the term "percentage" is used because there is a theoretical 100% relevance when the content is identical and a theoretical 0% relevance when the content does not overlap at all. However, in practice, the relevance percentage may be normalized in a way that does not correspond to a traditional 100% percentage or may not be normalized at all. Because the issue records and the corresponding content is inherently structured in nature, it may not be necessary to normalize the actual relevance percentage. Similarly, the threshold may also be represented as a percentage but it is not necessary that it be so. In some cases, the threshold is between 90% and 95%. In some cases, the threshold is between 80% and 90%. In some cases, the threshold is between 70% and 80%. In some cases, the threshold is between 60% and 70%. In some cases, the threshold is between greater than 50%.

In accordance with a determination that voice input or other content is associated with an attribute of the health matrix, the content displayed in the health matrix may be updated. For example, a narrative or other voice input may be provided by one or more of the participants 204a-c, which may be associated with a specific attribute, as determined by the voice interface system 210. The voice input may be analyzed and converted to text by the voice interface system 210 and one or more fields of the health matrix may be updated to include the respective content. The voice input may also be added to a composite score narrative that may be anonymized so that individual participants are not associated with specific content or narratives. The health matrix may also be updated to include the respective individual scores, which may be represented by a corresponding visual indicia. An example of an updated or intermediate health matrix and visual indicia is described below with respect to FIG. 3B.

In some embodiments, the voice interface system 210 is adapted to conduct a consensus vote from the participants 204*a-c* which includes a single group score for each respective attribute of the matrix. In accordance with some embodiments, the flow interactor 212 may be programmed or configured to implement a protocol for driving the participants 204*a-c* to a consensus or agreement on a score for each of the respective attributes. For example, the voice interface system 210 may be configured to analyze voice input from the participants 204*a-c* and generate a proposed or actual consensus score based on the individual voice inputs. In some cases, the proposed consensus score is provided to or displayed for participants 204*a-c*, who may confirm or change the consensus score, as appropriate. In another example, the flow interactor 212 may be configured to identify two or more different scores from the individual scores that are associated with a respective attribute. The flow interactor 212 may be adapted to provide a series of additional prompts to solicit a brief narrative regarding each different score, which may be analyzed and added to a composite narrative, in accordance with the other examples described herein. The flow interactor 212 may be adapted to conduct one or more subsequent consensus votes until the participants 204*a-c* converge on a single score for a respective attribute.

In general, the graphical user interface produced by the client application running on the terminal or client device 202 may be updated continuously in accordance with actions directed by the voice interface system 210. This allows the participants 204*a-c* to view the activities and modifications being performed as they are occurring, and to take appropriate corrective action if a voice response or voice input is misinterpreted or to redirect a course of action to reflect the intent of the team. In some instances, the voice interface system 210 may appear to be implementing the changes through the graphical user interface while, however, the graphical user interface is merely reflecting the modifications that have been implemented through the host service 220. In some cases, the graphical user interface may be adapted to provide an animation or graphical simulation that gives the appearance that the changes are being directed through the graphical user interface rather than being updated directly through the host service 220. In other embodiments, the voice interface system 210 may actually implement the changes through the graphical user interface using an advanced programming interface (API) or other interface that allows for control of the client application running on the terminal or client device 202 by the voice interface system 210.

The voice interface system 210 may also be configured to transmit a completed health matrix that is the product of the health monitor meeting or team diagnostic. In some cases the health matrix includes a (single) consensus score for each of the attributes of the health matrix. The health matrix may also include a composite score narrative or other feedback that is associated with a respective attribute of the health matrix. As discussed previously, the composite score narrative or other content may be anonymized such that specific content is not attributable or associated with a particular participant of the group of participants 204*a-c*. The completed and anonymized health matrix may be transmitted back to the host service 220, which may be stored by the profile management server 222 or other aspect of the host service 220.

The voice interface system 210 may also be adapted to maintain a log or summary of the various actions that were taken during the live meeting. For example, the voice interface system 210 may be adapted to create a transaction log of all actions taken as a result of voice input and other input received during a live meeting. The transaction log may be filtered to extract minor transactions or actions and/or to highlight more important actions. The transaction log may also be anonymized to obscure or extract associations between content and a specific participant. A filtered, anonymized, and/or formatted version of the transaction log may be transmitted (via e-mail, message, or other electronic communication) to one or more of the meeting participants 204*a-c*. In some cases, a meeting summary is transmitted or made available to users that did not attend the live meeting in a way to keep them informed of the team's activities and participation in the health monitor meeting.

Figure 3B:
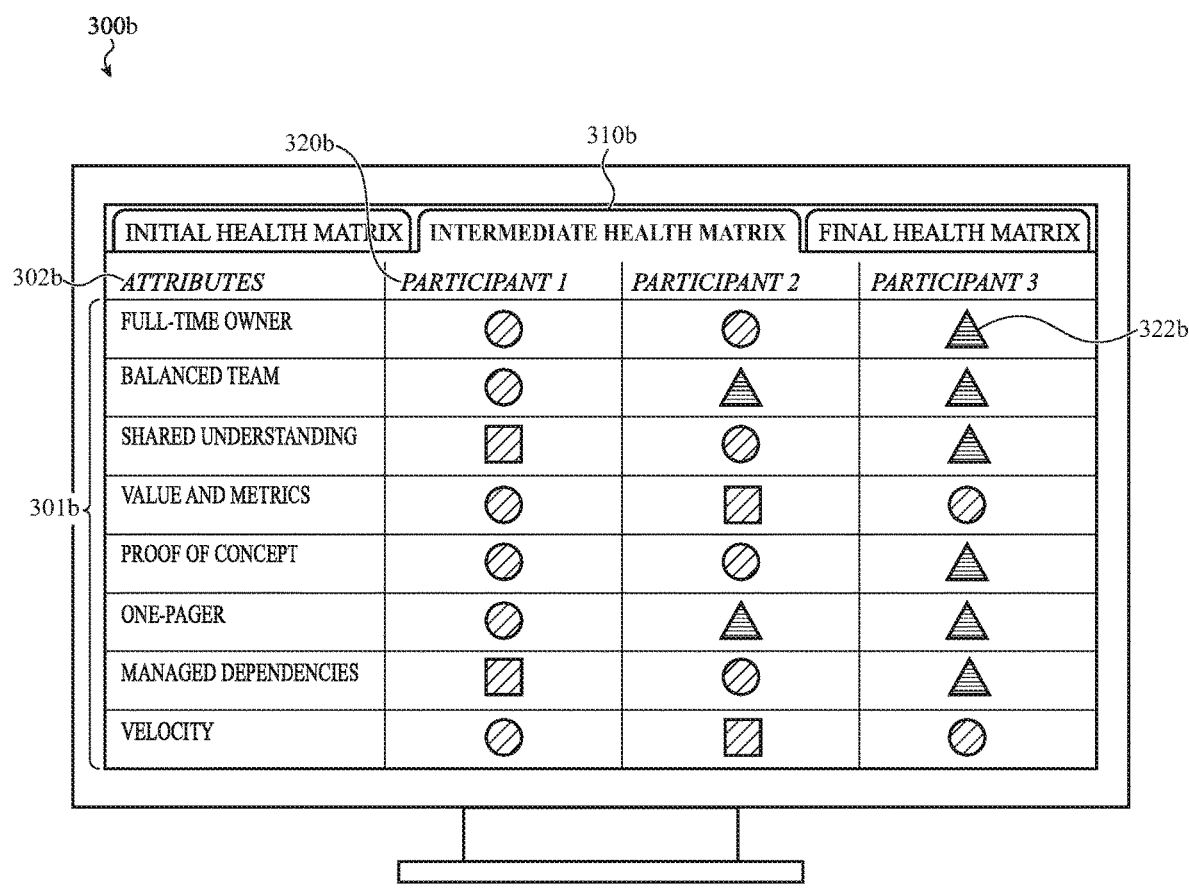

FIGS. 3A-3C depict example graphical user interfaces 300*a-c* that may be displayed on a terminal or client device. The graphical user interfaces 300*a-c* may be generated by a health monitor client application, which may include graphical objects remotely generated and viewed through a web browser and/or may include graphical objects that are generated locally on the client device by a dedicated issue tracking client application. While the following examples are provided with respect to a health monitor matrix, as visualized through a graphical user interface, the same or similar content may be used to generate a health monitor report, health monitor matrix, or other content to a host service, third party, or other entity that may want to view the results of a health diagnostic system or monitor the health of a team or group of participants.

In the examples of FIGS. 3A-3C, each health matrix 300*a-c* is accessible by selecting a respective tab 310*a-c*. For example, the initial health matrix 300*a* may be displayed in response to a selection of the tab 310*a*. Similarly, the intermediate health matrix 300*b* may be displayed in response to a selection of tab 310*b* and the final or completed health matrix 300*c* may be displayed in response to a selection of tab 310*c*. Other graphical user interface schemes including, for example, menus, selection boxes, discrete windows, or other elements may be used to trigger the display of the respective health matrices 300*a-c*.

The example depicted in FIG. 3A corresponds to an initial health monitor matrix 300*a*. The health monitor matrix 300*a* includes several rows of content, each row of content associated with a respective key team attribute 301*a*. FIG. 3A includes an attribute name column 302*a*, an attribute description column 304*a*, and an attribute example column 306*a*. The content used to complete or fill out the health monitor matrix 300*a* may be obtained from a library and/or a profile management server of a host service, as described above with respect to FIGS. 1 and 2. In some instances, the content used to populate the health monitor matrix 300*a* is determined, at least in part, on a type of team or group that is being evaluated. For example, the team type may correspond to a product development team type, a sales team type, a leadership team type, a non-profit organization team type, or other type of team. The one or more of the key team attributes 301a may be shared across different team types. However, the definition and the examples are typically customized to better relate to the type of team that is being evaluated.

The specific attributes may describe or relate to qualities of a team that may be used to predict the health or performance of the team. The attributes may change depending on the type of team that is being evaluated. By way of example, a first attribute may be directed to team balance, which may be related to the technical or skill breadth of the team. The team balance may also be a measure of experience and skill diversity. A team that includes too much of one type of expertise or experience level may have a lower balance score, while a team with a diverse mix of experience and skill levels may have a higher balance score. A second attribute may be directed to team shared understanding, which may be related to a sense that the team shares a common vision or set of goals. A team that has a clear vision and set of deliverables may score higher than a team in which there are multiple competing goals or a team for which the participant buy-in or investment in the stated goals is low. A third attribute may be directed to team goals, which may relate to the shared understanding of the team's vision or purpose. This attribute may also be called values and metrics. A team having well-articulated or clear values and metrics will score higher than a team with values that are difficult to apply or goals or metrics that do not have a clear meaning for the participants. Another attribute may be directed to a team summary also referred to as a one-pager. The strong team summary score may be associated with a team that has documented the purpose of the group in easy to understand plain English and that is published online through a collaboration tool or other method. Another attribute may be directed to team decision making, which may represent the team's ability to make decisions in an efficient and effective manner. A strong team decision making score may have a defined procedure or understanding of how decisions are made in the group and, importantly, how to resolve conflict and avoid decision impasses. Another attribute may be directed to team managed dependencies, which may represent the team's ability to communicate and work together with minimal supervision or external input. Teams with a high managed dependency score may have clear regular communication between the participants and may be perceived as a single functional unit or team from external parties or teams. Another attribute may be directed to team iterative improvement, also referred to as velocity. A team with a good iterative improvement score may have a demonstrated track record of leveraging lessons learned on prior projects and able to produce results in an efficient manner. A team with a good velocity may be relied on to see a project to completion with minimal supervision or redirection.

In some instances, the voice interface system is configured to use voice prompts to guide the team through the key attributes 301a during the live meeting. The voice interface system may also provide short narratives associated with content listed in the definition 304a and the example 306a columns of the health monitor matrix 300a. The voice interface system may provide synthesized speech that corresponds to the respective content, however, it is not necessary that the voice interface system merely output a voice version of the text displayed. In fact, in some embodiments, it may be beneficial for the voice interface system to provide a custom prompt that is different than the text that is displayed in order to provide more context and reduce redundancy. The voice prompts may also be delivered in increasing levels of detail in response to a request for further explanation received from the meeting participants.

The example of FIG. 3B corresponds to an intermediate health monitor matrix 300b. The health monitor matrix 300b includes several rows of content, each row of content associated with a respective key team attribute 301b. FIG. 3B includes an attribute name column 302b and one or more score columns 320b that correspond to scores provided by a respective participant. The score columns 320b include a visual indicia 322b that corresponds to the graduated score that was received from the respective participant. In general, a score may represent a degree to which the participant believes the team satisfies or possesses the respective attribute or attribute qualities. The visual indicia 322b may be represented by one of a set of colors (green, yellow, red) where each color represents a level or graduated score value. The color red may indicate a low score or criteria not satisfied level, the color yellow may indicate a medium score or criteria partially satisfied level, and the color green may indicate a high score or criteria fully satisfied level. There may be more than three colors, where each color corresponds to a different value of the graduated score. The visual indicia 322b may also be represented by one of a set of shapes (square, circle, and triangle) as depicted in FIG. 3B. Each shape may correspond to a score value of the graduated score. While colors and shapes are provided by way of example, the visual indicia 322b may also be represented by symbols, animations, characters, or other visual elements. In some cases, the visual indicia 322b is accompanied by text or number values.

In accordance with the examples provided herein, the score columns 320b may be populated in accordance with scores that are received from one or more client devices associated with the respective meeting participants. The individual scores may be entered, for example, through a user interface of one or more client devices, which prompts the respective user for a score corresponding to a respective key attribute 301b. In some instances, the voice interface system is configured to receive one or more of the scores as voice input, which may be analyzed to determine an appropriate score level and visual indicia 322b. The participants may be identified by name (e.g., "Bob" or "Jane D."), by initials, or may be identified by a generic text (e.g., "participant 1" or "user 1"). In some cases, personal names or initials are displayed when the health monitor matrix 300b is displayed on the terminal device but the names are stripped or anonymized before sending the health monitor matrix as a report or other form to the host service.

The example of FIG. 3C corresponds to a completed health monitor matrix 300c. The health monitor matrix 300c includes several rows of content, each row of content associated with a respective key team attribute 301c. FIG. 3C includes an attribute name column 302c, a consensus score column 330c, and a composite score narration column 332c. Similar to the previous example, the consensus score column 330c include a visual indicia 322c that corresponds to the graduated score that was received from the team. The consensus score may be determined in accordance with one or more of the techniques described herein. The completed health monitor matrix 300c may also include a composite score narration that is based on voice input received from the meeting participants during the live meeting. In general, the composite score narration includes an explanation or justification for the composite score and may include other team feedback associated with the respective key attribute 301c. The composite score narration, along with other content of the completed health monitor matrix 300c, may be anonymized so that none of the narrations or other content is attributable or associated with a specific participant of the team of participants.

Figure 4:
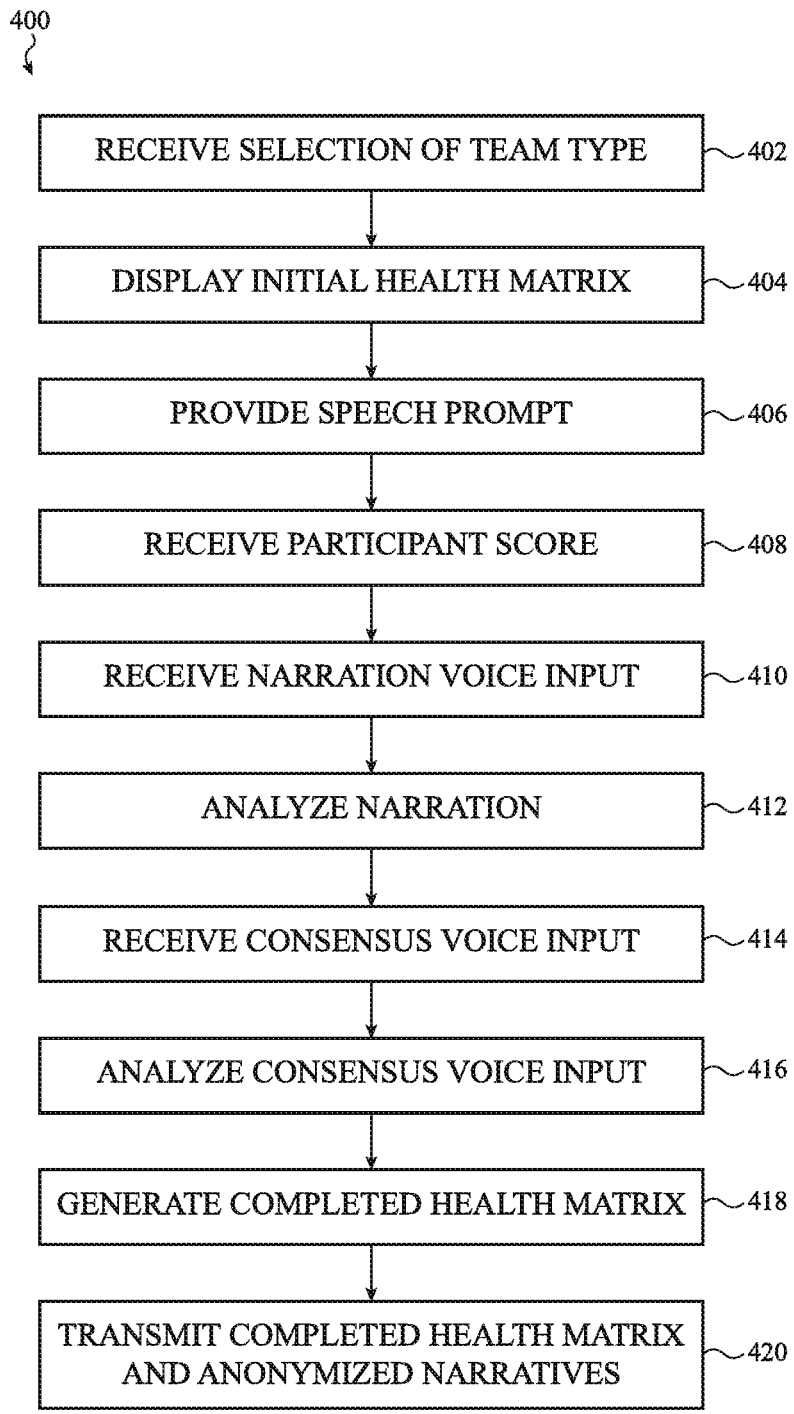
FIG. 4 is an example process for operating a voice interface system.

FIG. 4 depicts an example process 400 for conducting a live meeting in order to produce a health matrix for a team or group of participants. The process 400 may be implemented using one or more of the systems and voice interface systems described herein. In accordance with some embodiments, one or more operations of the process 400 may be omitted. Likewise, the process 400 may not be inclusive of all operations or steps, depending on the implementation.

In operation 402, a team type is received from a user, who may be a participant of the live meeting. In some cases, the selection of operation 402 is received from an administrator or a person not participating in the meeting. Operation 402 may be optional in some implementations as a health monitor or a team diagnostic may be generalized enough that the content may be relevant for a variety of team types. However, in other embodiments, it may be beneficial to receive a selection of the team type in order to customize or tailor the health monitor content to be more relevant to the participants of the live meeting. The voice interface system may be configured to handle a variety of team types including, for example, a product development team type, a sales and marking team type, a leadership team type, a non-profit organization team type, or other type of team or organization. In response to receiving a selection of the team type, the voice interface system may retrieve content from a profile management server or a library of a host service (e.g., profile management server 122, library 126, and host service 120 of FIG. 1) in order to obtain a set of key attributes, attribute descriptions, attribute examples, and other content that has been adapted to correspond to the selected team type. The selection of the team type may be performed using a graphical user interface of the terminal device or a client device that is operably coupled to the host service and/or the voice interface system by a computer network.

In operation 404, an initial health matrix is displayed. The initial health matrix may be displayed on a display of a terminal device that is viewable by the participants of the meeting. The initial health matrix may also be displayed on one or more client devices that are operated by the meeting participants and are running or executing a client application that provides a client-side graphical user interface. The initial health matrix may include a set of key attributes that will be used to evaluate the team. The initial health matrix may also include a brief description for each key attribute, one or more attribute examples, and other content associated with the set of key attributes. The content used to populate the initial health matrix may be obtained from the library and/or profile management server of the host system, as described above with respect to FIGS. 1 and 2. An example initial health matrix is described above with respect to FIG. 3A.

In operation 406, the voice interface system provides one or more speech prompts. In accordance with the embodiments described herein, the voice interface system may produce a synthesized speech prompt that prompts the meeting participants for feedback regarding one or more of the attributes that are displayed in the initial health matrix. The prompts may include the name of a respective attribute, a brief description of the attribute, one or more examples associated with the attribute, or other content associated with the attribute. The synthesized speech may correspond to, but not match, the description and text displayed in the initial health matrix. In some implementations, the voice interface system is adapted to provide further prompts or attribute information in response to requests or questions from the participants from the team, which may be provided as voice input (and interpreted by the voice interface system in accordance with the embodiments described herein).

In operation 408, a score is received from each of the meeting participants with respect to one or more of the attributes displayed in the initial matrix. In some implementations, the meeting participants may provide a graduated, scaled, or otherwise scored user input that represents a degree to which the participant believes the team satisfies the particular attribute or has the qualities of the attribute. The individual scores may be received by the voice interface system as voice input and/or the individual scores may be received through the client devices operated by the respective participants. As described above with respect to FIGS. 3A-3C, the score may be represented by a visual indicia, which may have a color, shape, or other property that indicates the score. In some implementations, an intermediate health matrix is displayed that includes the visual indicia that corresponds to the individual scores. An example intermediate health matrix is described above with respect to FIG. 3B.

In operation 410, the voice interface system receives a narration voice input. In accordance with the embodiments described herein, one or more of the participants may provide a narrative or other feedback that justifies or explains the score provided in operation 408. In some implementations, the voice interface system prompts each user to provide a brief narrative regarding his or her score. In other implementations, the voice interface system is adapted to monitor a live discussion that occurs after the scoring. The voice interface system may be adapted to identify distinct voice input provided by one or more of the participants and associate the voice input with a particular attribute and/or user, as necessary.

In operation 412, the voice interface system analyzes the narration. In particular, the voice interface system may be configured to analyze the voice input received in operation 410, which may be provided in an ordered manner, as prompted through voice prompts provided by the voice interface system, or as part of a free discussion. In accordance with the embodiments described herein, the voice analyzer and analyzer (118 and 114 of FIG. 1) of the voice interface system may be adapted to convert the voice input into a set of text or dataset. The text or dataset may then be analyzed using one or more natural language processing techniques to extract a set of keywords or other content that may be representative of the discussion.

The voice interface system may be adapted to compute a relevance percentage or other metric for the keywords or analyzed dataset with respect to one or more of the attributes of the health matrix. The keywords or analyzed dataset may be compared with the attribute title, attribute description, attribute examples, or other attribute content in order to determine a relevancy percentage or other metric. The relevance percentage may be measured on a scale of 0% to 100% but this is not necessary. In some implementations, the relevance percentage is a relative measure of correlation or similarity between extracted content and content associated with the respective attribute, which may be represented by any appropriate numerical quantity. For ease of use, the term "percentage" is used because there is a theoretical 100% relevance when the content is identical and a theoretical 0% relevance when the content does not overlap at all. However, in practice, the relevance percentage may be normalized in a way that does not correspond to a traditional 100% percentage or may not be normalized at all. Because the content for the respective attribute and the corresponding content may include similar phrasing and terms, as driven by the prompts and discussion, it may not be necessary to normalize the actual relevance percentage. Similarly, the threshold may also be represented as a percentage but it is not necessary that it be so. In some cases, the threshold is between 90% and 95%. In some cases, the threshold is between 80% and 90%. In some cases, the threshold is between 70% and 80%. In some cases, the threshold is between 60% and 70%. In some cases, the threshold is between greater than 50%.

Based on the relevance percentage or other metric satisfying a criteria, the voice input may be associated with the respective attribute. For example, if the relevance percentage exceeds a threshold for a particular set of keywords or analyzed content, the voice interface system may associate the corresponding voice input with the respective attribute. In another example, if the keywords or analyzed dataset has a relevancy percentage that is greater with respect to one attribute, as compared to a relevancy percentage of one or more other attributes, the attribute having the greatest score may be associated with the corresponding voice input. In some instances where the relevancy score or other metric does not satisfy a threshold or other criteria, the voice input may be associated with a general feedback or narrative portion of the health matrix. In some implementations, the voice input is discarded if the relevancy percentage or other metric criteria is not satisfied.

In some implementations, the analyzed narration of operation 412 is added to a composite narration for the respective attribute. For example, each voice input that is associated with a particular attribute may be converted to text. The converted text may be combined with the other converted voice input to create a composite text narrative that may be formulated as a paragraph or other block of text. In some cases, the composite narrative is added to a cell or field of the health matrix. In some cases, the text narrative attributes a respective participant with the input to allow the participant to review and revise the narrative, as necessary. The text narrative, including the composite narrative, may be anonymized to remove reference or attribution to any specific participant. This may maintain the contributor's anonymity for when the health matrix is saved in the profile management server, database, or other aspect of the system or communicated to a person that did not participate in the health monitor meeting.

In operations 414 and 416, the voice interface system receives and analyzes the consensus voice input. In some cases, the consensus voice input includes a single team or group score for each respective attribute of the set of attributes. In some implementations, the voice interface system is adapted to provide a series of prompts in order to obtain a consensus vote for each of the attributes. For example, the voice interface system may be adapted to propose a team or group score based on an aggregation of the individual scores that were received as part of operation 408. The prompts may be adapted to receive a justification narration for one or more scores that are identified as outlier scores or otherwise different than a subset of other scores that may be in agreement. The prompts may also be adapted to receive a justification narration for one or more of the scores that are in agreement. After prompting for the justification narrations, the voice interface system may be adapted to conduct a subsequent consensus vote to obtain a single team or group score for the respective attribute. This process may be repeated until the group of participants agrees on a single group score for the respective attribute. In some implementations, at least a portion of the justification narrations are added to composite narration for the respective attribute and included in the final health matrix.

In operation 418, the system generates a completed health matrix. In accordance with the embodiments described herein, the completed health matrix may include a consensus score, which represents the single score that was agreed upon by the group of participants in operations 414 and 416. The completed health matrix may also include a composite narrative that was formulated based on voice input received during the live discussion of the meeting. The composite narrative may be anonymized so that specific content is not attributed to one or more specific participants of the live meeting. As discussed previously, the participants' names or initials may be removed or may be replaced by a generic placeholder such as "participant 1" or "user A." An example final or completed health matrix is described above with respect to FIG. 3C.

In operation 420, the completed health matrix is transmitted to a host service or other recipient. In some implementations, the completed health matrix is transmitted to a profile management server (e.g., 122 of FIG. 1), which may store and catalog health matrices for a group of teams in the database. The profile management server may also be adapted to keep a historical record of completed health matrices for a particular team or group and generate a progression report or historical heath monitor progress report that may be viewed by the team or other users of the system.

Figure 5:
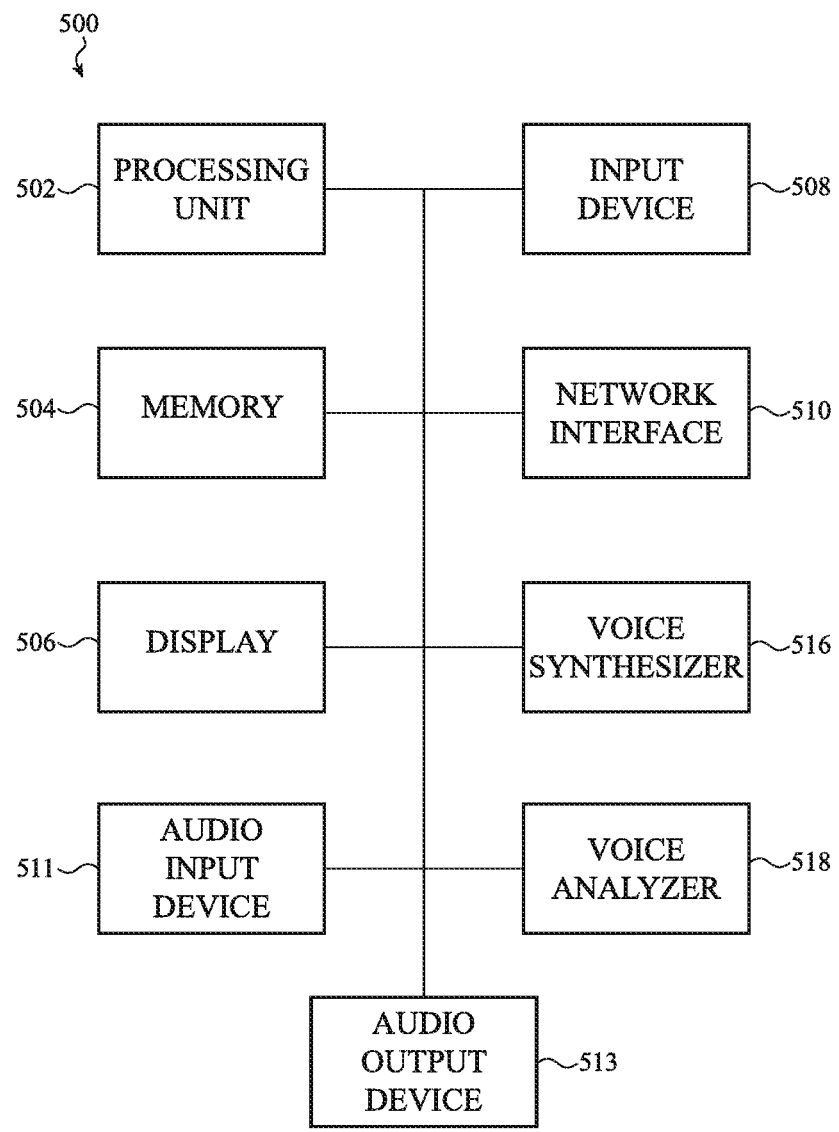
FIG. 5 depicts an example hardware configuration of a voice interface system.

FIG. 5 depicts an example schematic diagram of a device 500. By way of example, the device 500 of FIG. 5 may correspond to the voice interface system or terminal device or client device described above with respect to FIGS. 1-3C (or any other voice interface systems described herein). Aspects of the device 500 may also correspond to elements of the host service, issue tracking server, and other elements of the issue tracking system described herein. To the extent that multiple functionalities, operations, and structures are disclosed as being part of, incorporated into, or performed by the device 500, it should be understood that various embodiments may omit any or all such described functionalities, operations, and structures. Thus, different embodiments of the device 500 may have some, none, or all of the various capabilities, apparatuses, physical features, modes, and operating parameters discussed herein.

As shown in FIG. 5, a device 500 includes a processing unit 502 operatively connected to computer memory 504. The processing unit 502 may be operatively connected to the memory 504 components via an electronic bus or bridge. The processing unit 502 may include one or more computer processors or microcontrollers that are configured to perform operations in response to computer-readable instructions. The processing unit 502 may include the central processing unit (CPU) of the device. Additionally or alternatively, the processing unit 502 may include other processors within the device including application specific integrated chips (ASIC) and other microcontroller devices.

The memory 504 may include a variety of types of non-transitory computer-readable storage media, including, for example, read access memory (RAM), read-only memory (ROM), erasable programmable memory (e.g., EPROM and EEPROM), or flash memory. The memory 504 is configured to store computer-readable instructions, sensor values, and other persistent software elements. The memory 504 may also include a variety of types of non-transitory computer-readable storage media including, for example, a hard-drive storage device, a solid-state storage device, a portable magnetic storage device, or other similar device.

The memory 504 may also be configured to store computer-readable instructions, sensor values, and other persistent software elements.

In this example, the processing unit 502 is operable to read computer-readable instructions stored on the memory 504. The computer-readable instructions may be provided as a computer-program product, software application, client application, issue tracking client application, and so on.

As shown in FIG. 5, the device 500 also includes a display 506. The display 506 may include a liquid-crystal display (LCD), an organic light emitting diode (OLED) display, a light emitting diode (LED) display, or the like. If the display 506 is an LCD, the display 506 may also include a backlight component that can be controlled to provide variable levels of display brightness. If the display 506 is an OLED or LED type display, the brightness of the display 506 may be controlled by modifying the electrical signals that are provided to display elements. The display 506 may correspond to any of the displays shown or described herein, such as the display 102 (FIG. 1) that is used to display a graphical user interface in accordance with the embodiments described herein.

In some embodiments, the device 500 includes one or more input devices 508. An input device 508 is a device that is configured to receive user input. The one or more input devices 508 may include, for example, a rotatable input system, a push button, a touch-activated button, a keyboard, a key pad, or the like (including any combination of these or other components). In some embodiments, the input device 508 may provide a dedicated or primary function, including, for example, a power button, volume buttons, home buttons, scroll wheels, and camera buttons.

The device 500 may also include a network interface 510 that is configured to transmit and/or receive signals or electrical communication from an external or separate device. The network interface 510 may be configured to couple to an external device via a cable, adaptor, or other type of electrical connector. In some embodiments, the network interface 510 may be used to couple the device 500 to an accessory, including a dock or case, a stylus or other input device, smart cover, smart stand, keyboard, or other device configured to send and/or receive electrical signals.

The device 500 may also include an audio input device 511 and an audio output device 513. The audio input device 511 may include a microphone or other audio or acoustic sensor that is configured to detect an audio or voice input, in accordance with embodiments described herein. The audio input device 511 may also include signal processing circuitry including, for example, an analog to digital converter, one or more signal filtering circuits, and the like. The audio output device 513 may include a speaker or other device configured to produce an audio output. In accordance with the embodiments described herein, the audio output device 513 may be configured to produce an audio output that is recognizable as speech or voice output. The audio output device may include associated drive circuitry including, for example, digital to analog converters, signal amplifiers, cross-over circuits, filters, and the like.

The device 500 may also include a voice synthesizer 516. As described herein, the voice synthesizer 516 may include hardware and software elements or components that are configured to produce an audio signal corresponding to a speech or voice output in response to a dataset or text string. In some implementations, the voice synthesizer 516 includes one or more text-to-speech (TTS) components that are configured to convert a text string into an audio signal that is recognizable by a user as speech. The voice synthesizer 516 may include one or more modules or software developer kits that implement one or more of the TTS protocols or elements, as described herein.

The device 500 may also include a voice analyzer 518. As described herein, the voice analyzer 518 may include hardware and software elements or components that are configured to produce a dataset or text string in response to an audio signal or voice input. In some embodiments, the voice analyzer 518 implements a Hidden Markov Model (HMM) that divides the audio stream or signal into fragments for which one or more coefficients or vectors is computed. The series of coefficients or vectors may be matched to one or more phonemes or units of speech, which may be used to determine corresponding text. The voice analyzer 518 may include one or more modules or software developer kits that implement one or more of the voice-to-text protocols or elements. The voice analyzer 518 may perform the voice-to-text processing using a synchronous, asynchronous, streaming, or other architecture for processing audio or voice input.

While the device 500 is described as having a particular set of components, the device 500 is not limited to only those components described herein. For example, a device may include more than one of the components described with respect to FIG. 5 or elsewhere in the instant application, and may indeed include other components not described herein.

It is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Accordingly, one may appreciate that, although many embodiments are disclosed above, the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

We claim:

1. A voice-activated networked system for producing an anonymized health matrix for a team of participants during a live meeting, the system comprising:
   a terminal device having a display that is configured to display a graphical user interface;
   a host service including a profile management server and an attribute library; and a voice interface system for facilitating the live meeting attended by the team of participants, the voice interface system comprising a processing unit that is configured to:
- receive a selection of a team type;
- in response to the selection of the team type, cause the graphical user interface to display an initial health matrix, the initial health matrix including a set of team attributes obtained from the attribute library of the host service based on the team type; and
- for each team attribute of the set of team attributes:
  - produce a speech audio prompt including a description a respective team attribute of the set of team attributes;
  - receive a participant score from each participant of the team of participants for the respective team attribute;
  - receive a narration voice input from one or more participants of the team of participants regarding the participant score;
  - analyze the narration voice input to determine a set of score narrations;
  - receive a consensus voice input from the team of participants; and
  - analyze the consensus voice input to determine a consensus score for the respective team attribute;
- generate a completed health matrix including a visual indicia for each consensus score associated with each team attribute of the set of team attributes; and
- transmit the completed health matrix and the set of score narrations to the profile management server, wherein each score narration of the set of score narrations is not associated with a specific participant of the team of participants.

2. The voice-activated networked system of claim 1, wherein:
- during the live meeting, each participant of the group of participants operates a respective client device running a respective client application;
- each participant inputs the participant score using the respective client application running on the respective client device; and
- the voice interface system receives the participant score from each respective client device via a network.

3. The voice-activated networked system of claim 1, wherein:
- the participant score is defined by a graduated scale including three or more levels; and
- the three or more levels include:
  - a first level indicating that the team of participants satisfies the respective team attribute;
  - a second level indicating that the team of participants partially satisfies the respective team attribute; and
  - a third level indicating that the team of participants does sufficiently satisfy the respective team attribute.

4. The voice-activated networked system of claim 3, wherein:
- the voice interface system is configured to cause the graphical user interface to display an intermediate health matrix; and
- the intermediate health matrix includes a visual shape indicia representing each client score received from the team of participants.

5. The voice-activated networked system of claim 1, wherein:
- the completed health matrix includes a composite score narration for one or more team attributes of the set of team attributes; and
- the composite score narration is an aggregation of one or more score narrations associated with the respective team attribute.

6. The voice-activated networked system of claim 1, wherein the set of team attributes includes:
- a first attribute that is directed to team balance;
- a second attribute that is directed to team shared understanding;
- a third attribute that is directed to team goals;
- a fourth attribute that is directed to a team summary;
- a fifth attribute that is directed to team decision making;
- a sixth attribute that is directed to team managed dependencies; and
- a seventh attribute that is directed to team iterative improvement.

7. A voice-activated networked system for producing an anonymized health matrix for a team of participants during a live meeting, the system comprising:
- a terminal device having a display that is configured to display a graphical user interface;
- a host service including a profile management server and an attribute library; and
- a voice interface system for facilitating the live meeting attended by the team of participants, the voice interface system comprising a processing unit that is configured to:
  - obtain a set of team attributes from the attribute library of the host service;
  - for each team attribute of the set of team attributes:
    - produce a synthesized speech prompt including a description of a respective team attribute of the set of team attributes;
    - receive a participant score from each participant of the team of participants for the respective team attribute;
    - receive a consensus voice input from the team of participants; and
    - analyze the consensus voice input to determine a consensus score;
  - receive a narration voice input from one or more participants of the team of participants;
  - analyze the narration voice input to determine a score narration;
  - determine a relevancy percentage for the score narration with respect to one or more of the set of team attributes;
  - identify an associated team attribute for the score narration based on the relevancy percentage satisfying a criteria;
  - generate the anonymized health matrix including a visual indicia for each consensus score associated with each team attribute of the set of team attributes; and
  - transmit the anonymized health matrix and a set of score narrations to the profile management server, wherein each score narration of the set of score narrations is anonymized with respect to the team of participants.

8. The voice-activated networked system of claim 7, wherein:
- the voice interface system is configured to add the score narration to content from one or more other score narrations associated with the set of team attributes to create a composite score narration; and the set of score narrations includes the composite score narration for the associated team attribute in the anonymized health matrix.

9. The voice-activated networked system of claim 7, wherein:
the consensus score is displayed on the graphical user interface as a confirmatory visual indicia; and
the voice interface system is configured to receive a confirmatory input from one or more of the team participants confirming the consensus score.

10. The voice-activated networked system of claim 9, wherein:
the consensus voice input includes individual consensus voice input from each participant of the team of participants; and
the voice interface system is configured to determine the consensus score based on the individual consensus voice inputs.

11. The voice-activated networked system of claim 10, wherein:
the voice interface system is configured to identify one or more outlier individual consensus voice inputs;
the voice interface system is configured to provide at least one additional prompt to one or more participants associated with the one or more outlier individual consensus voice inputs;
the voice interface system is configured to receive at least one additional narration voice input in response to the at least one additional prompt; and
the voice interface system is configured to solicit a subsequent consensus score in response to receiving the at least one additional narration voice input.

12. The voice-activated networked system of claim 7, wherein:
the voice interface system is further configured to receive an inquiry voice input from one or more participants of the team of participants; and
in response to the inquiry voice input, the voice interface system is configured to produce a responsive speech output that includes one or more of a description of the respective team attribute or an example of the respective team attribute.

13. The voice-activated networked system of claim 12, wherein:
in response to the inquiry voice input, the voice interface system is configured to cause the graphical user interface to include at least a portion of one or more of the description of the respective team attribute or the example of the respective team attribute.

14. The voice-activated networked system of claim 7, wherein:
the voice interface system is further configured to receive a selection of a type of team from a set of team types from a participant of the team of participants; and
the team of participants that is obtained from the attribute library depend, at least in part, on the type of team selected by the participant.

15. A networked system for producing an anonymized health matrix for a team of participants during a live meeting, the system comprising:
a terminal device having a display that is configured to display a graphical user interface;
a host service including a profile management server and an attribute library; and
a voice interface system for facilitating the live meeting attended by the team of participants, the voice interface system comprising a processing unit that is configured to:
cause the graphical user interface to display an initial health matrix, the initial health matrix including a set of team attributes obtained from the attribute library of the host service;
produce a synthesized speech prompt including a description of each team attribute;
receive a voice input including a request for one or more of: a definition or an example for one or more team attributes of the set of team attributes;
receive a participant score from each participant of the team of participants for each of the set of team attributes displayed in the initial health matrix;
receive a narration voice input from one or more participants of the team of participants;
analyze the narration voice input to determine a score narration associated with a respective user score;
determine a consensus score for a respective team attribute;
generate a completed health matrix including a graphical item for each consensus score associated with each team attribute of the set of team attributes; and
transmit the completed health matrix and a set of score narrations including the score narration to the profile management server, wherein each score narration of the set of score narrations are not associated with a specific participant of the team of participants.

16. The networked system of claim 15, wherein:
determining the consensus score comprises:
receiving a consensus voice input;
determining a relevancy percentage for the consensus voice input with respect to multiple team attributes of the set of team attributes; and
identifying a corresponding team attribute having a respective relevancy percentage that satisfies a criteria.

17. The networked system of claim 16, wherein the respective relevancy percentage is greater than other relevancy percentages that were determined with respect to other team attributes of the multiple team attributes.

18. The networked system of claim 15, wherein the graphical item includes a visual indicia having a distinctive shape or color that represents a graduated scale of the consensus score.

19. The networked system of claim 15, wherein the completed health matrix includes only one consensus score for each respective attribute of the set of team attributes.

20. The networked system of claim 15, wherein the set of team attributes includes:
a first attribute that is directed to team balance;
a second attribute that is directed to team shared understanding;
a third attribute that is directed to team goals;
a fourth attribute that is directed to a team summary;
a fifth attribute that is directed to team decision making;
a sixth attribute that is directed to team managed dependencies; and
a seventh attribute that is directed to team iterative improvement.

* * * * *